Figures 5, 11:
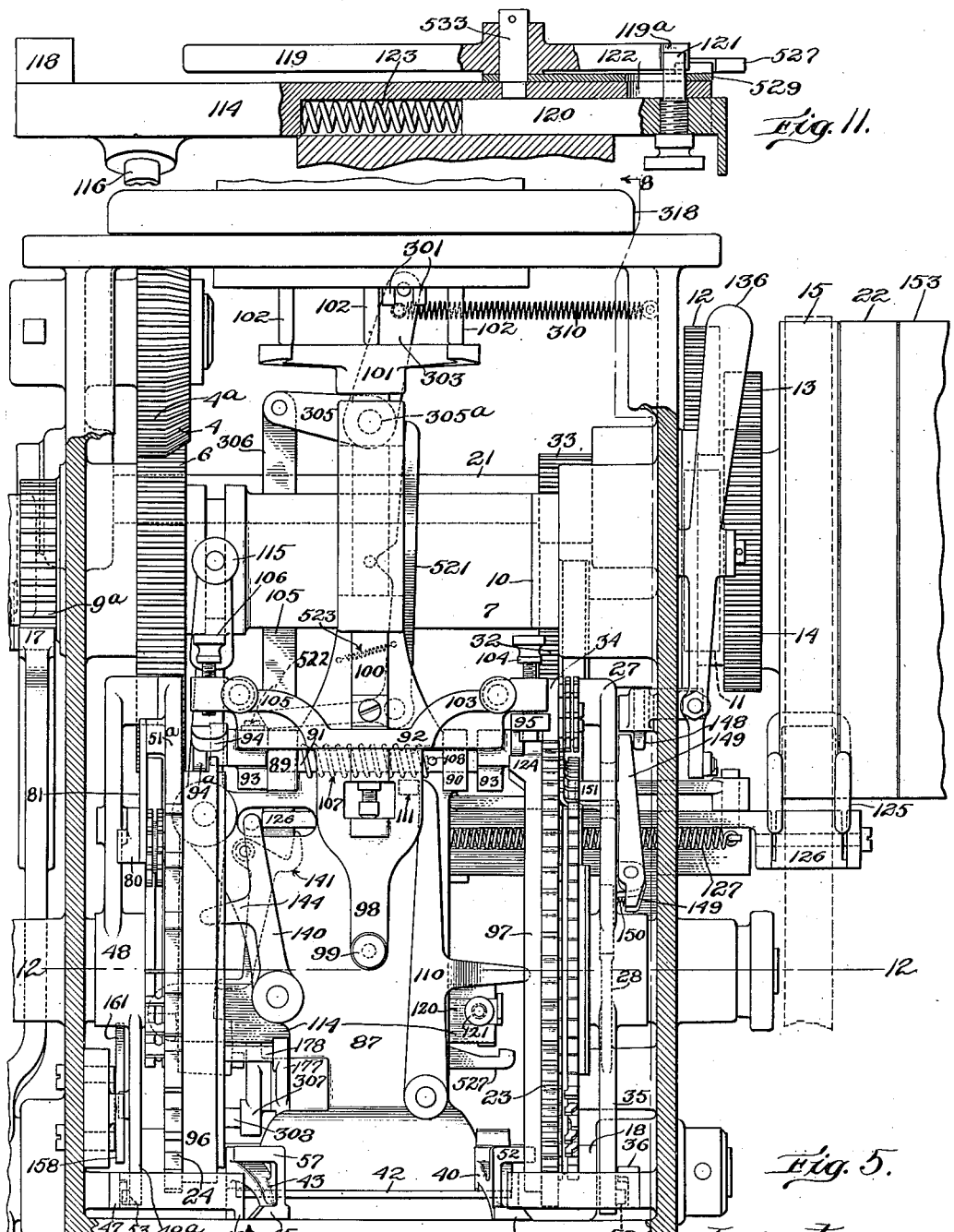

A. N. AMES.
KNITTING MACHINE.
APPLICATION FILED JUNE 26, 1911.
1,052,877.
Patented Feb. 11, 1913.
18 SHEETS—SHEET 1.
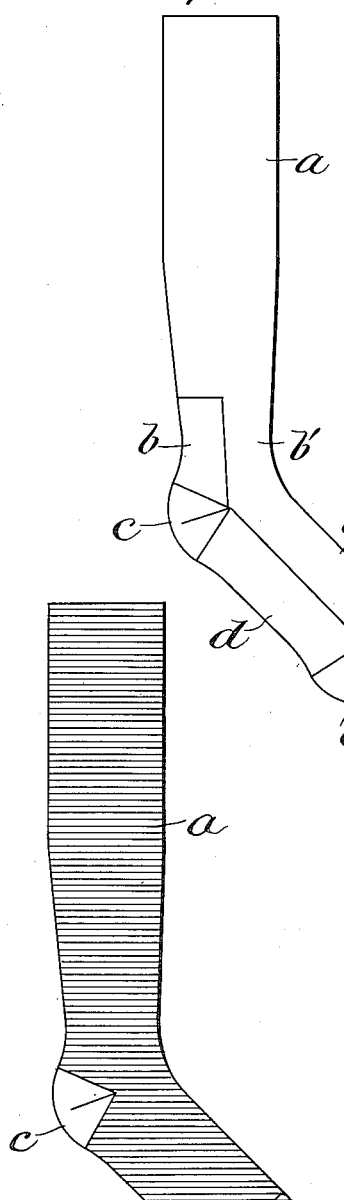
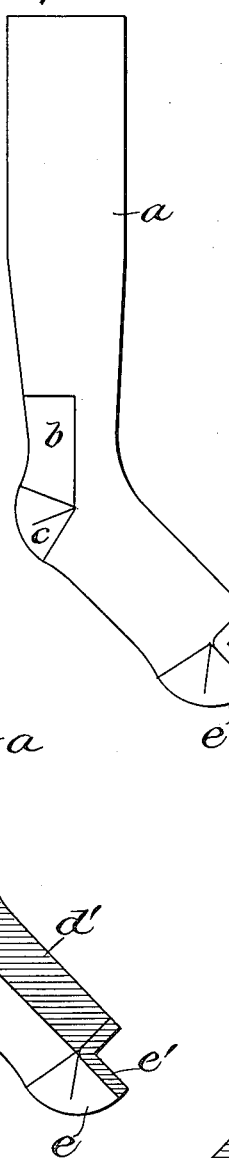
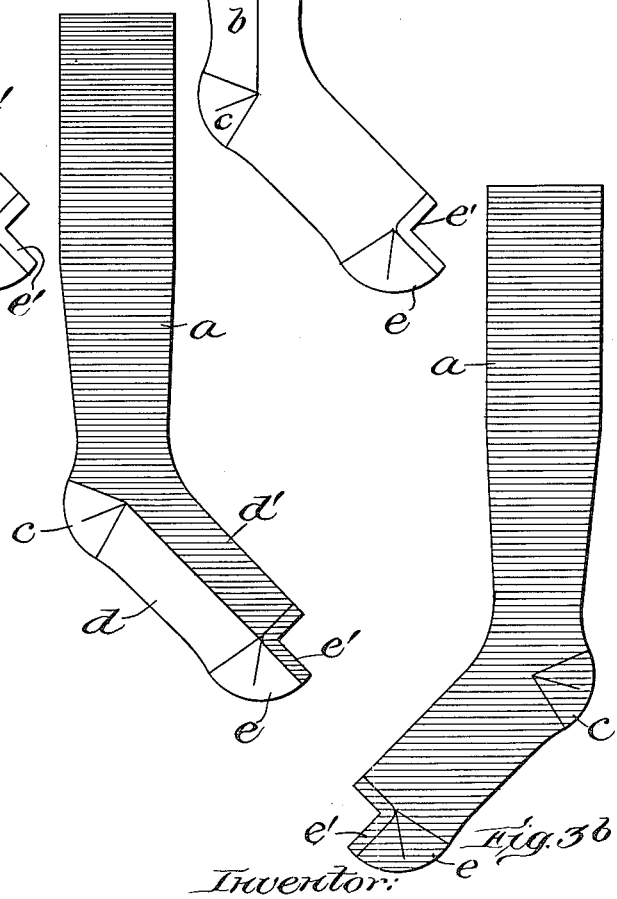
Witnesses:
Harry L. Allen
Inventor:
Arthur N. Ames,
by attys.

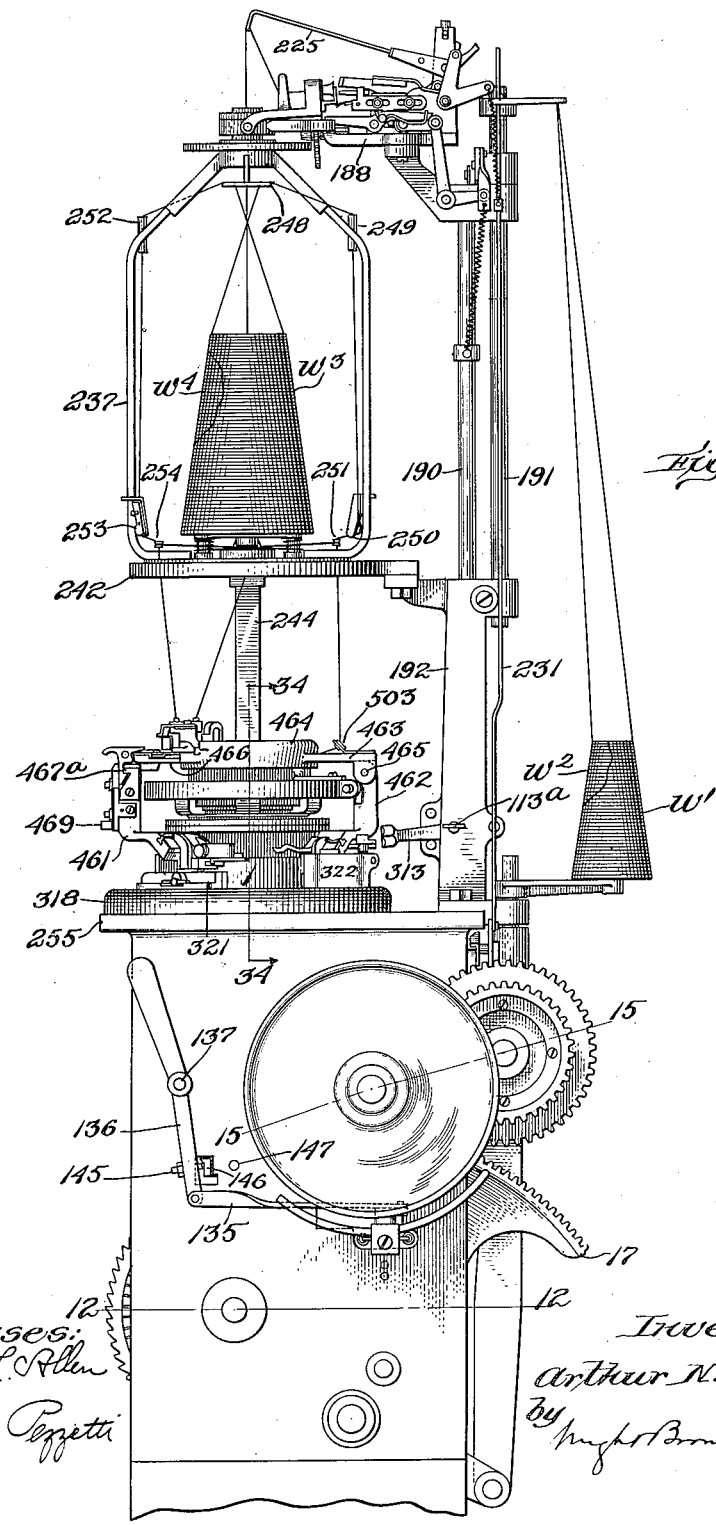

A. N. AMES.
KNITTING MACHINE.
APPLICATION FILED JUNE 26, 1911.

1,052,877.

Patented Feb. 11, 1913.
18 SHEETS—SHEET 3.

Witnesses:
Harry L. Allen
P. W. Pezzetti

Inventor:
Arthur N. Ames,
by Wright Brown Quinby May
attys.

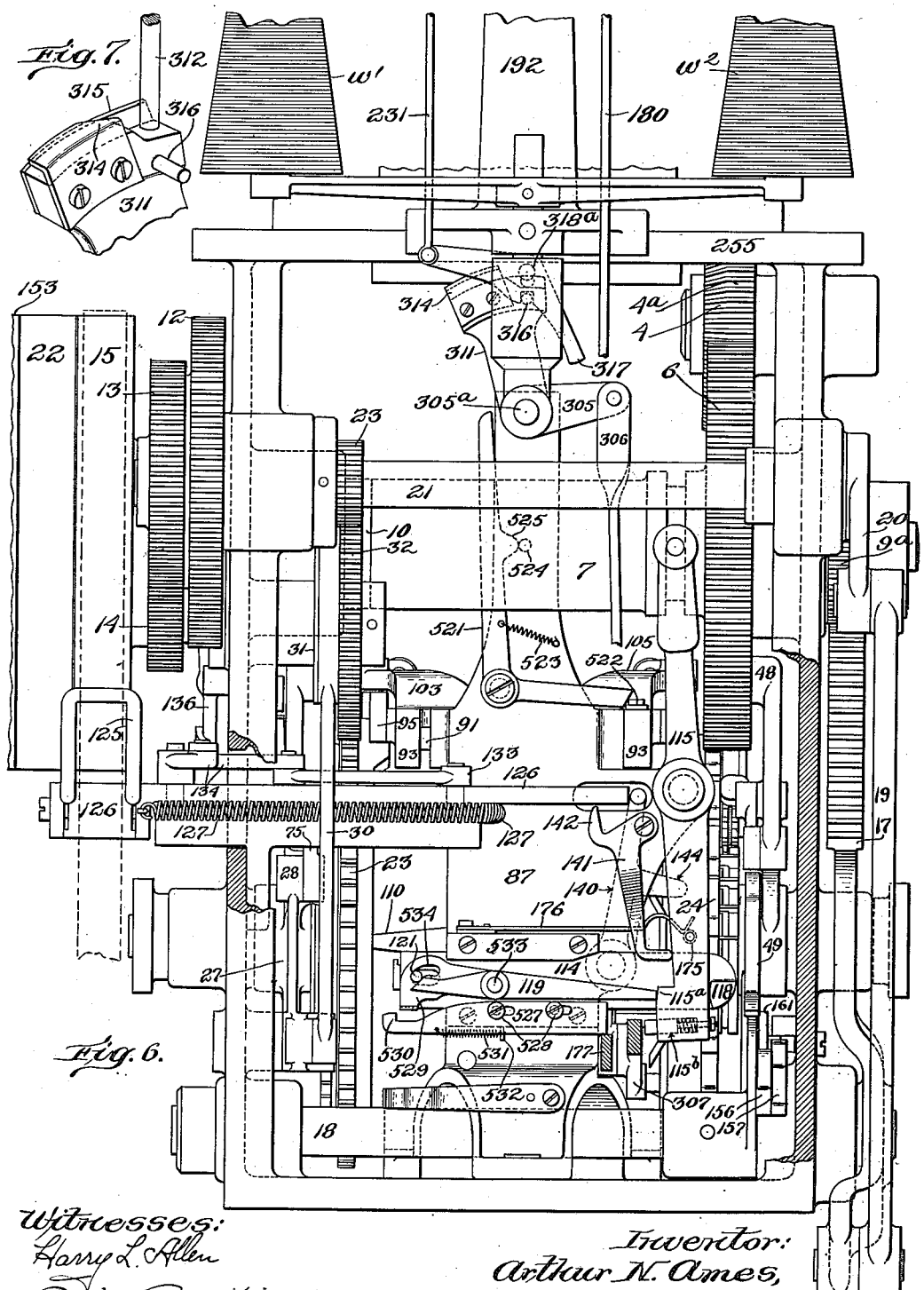

A. N. AMES.
KNITTING MACHINE.
APPLICATION FILED JUNE 26, 1911.

1,052,877.

Patented Feb. 11, 1913.
18 SHEETS—SHEET 6.

Witnesses:
Harry L. Allen
P. W. Pezzetti

Inventor:
Arthur N. Ames,
by Wright Brown Quinby May
Attys.

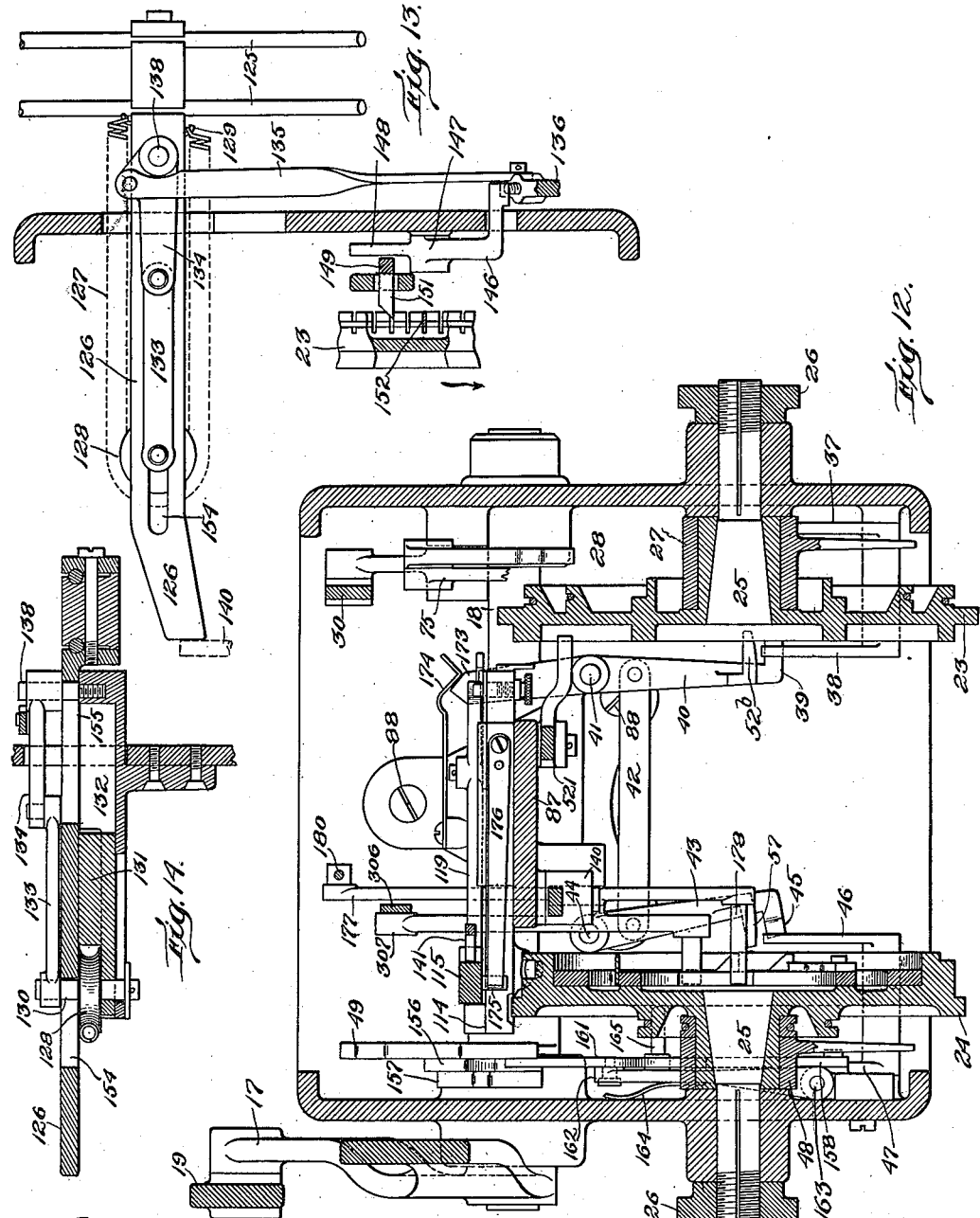

A. N. AMES.
KNITTING MACHINE.
APPLICATION FILED JUNE 26, 1911.
1,052,877.
Patented Feb. 11, 1913.
18 SHEETS—SHEET 8.
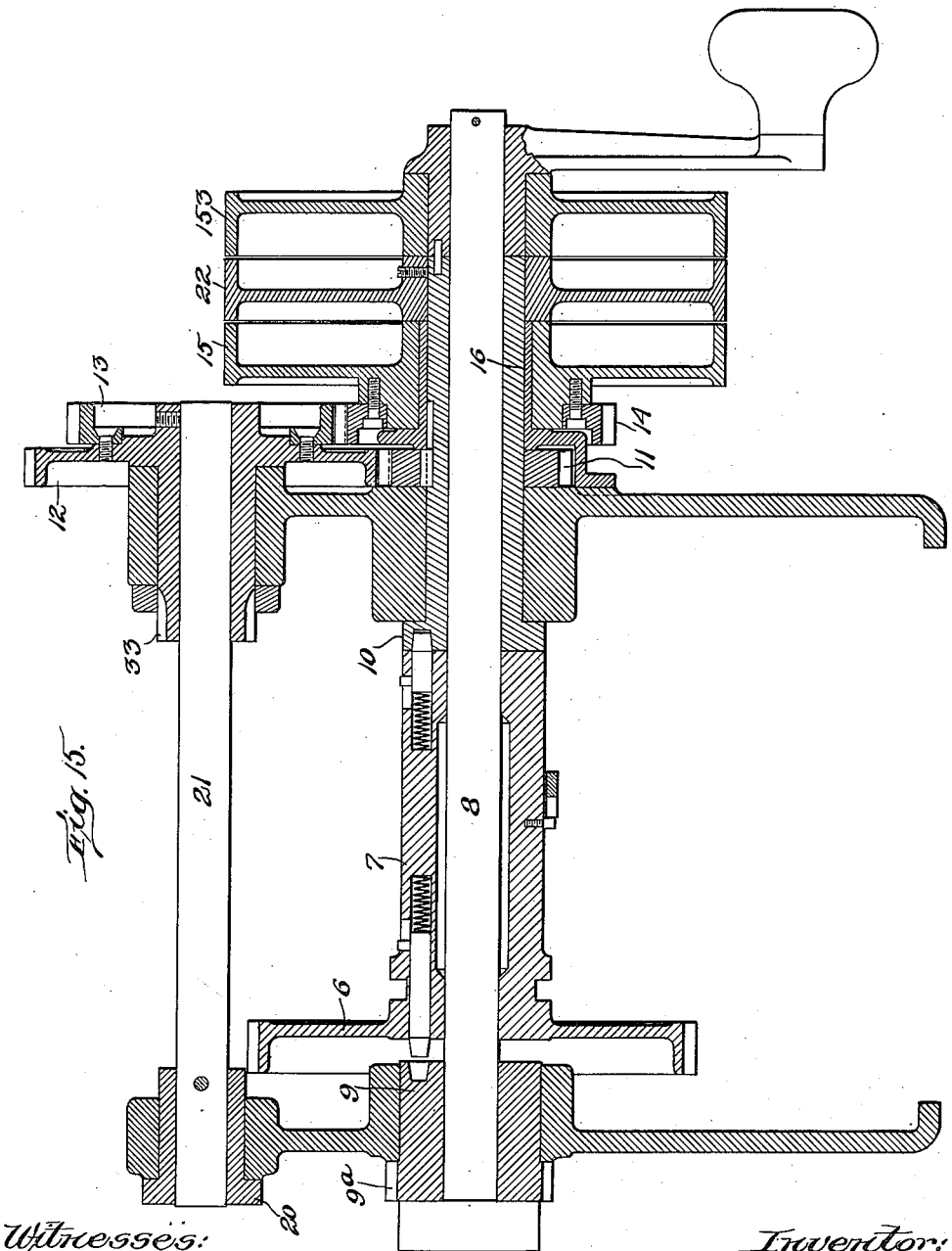

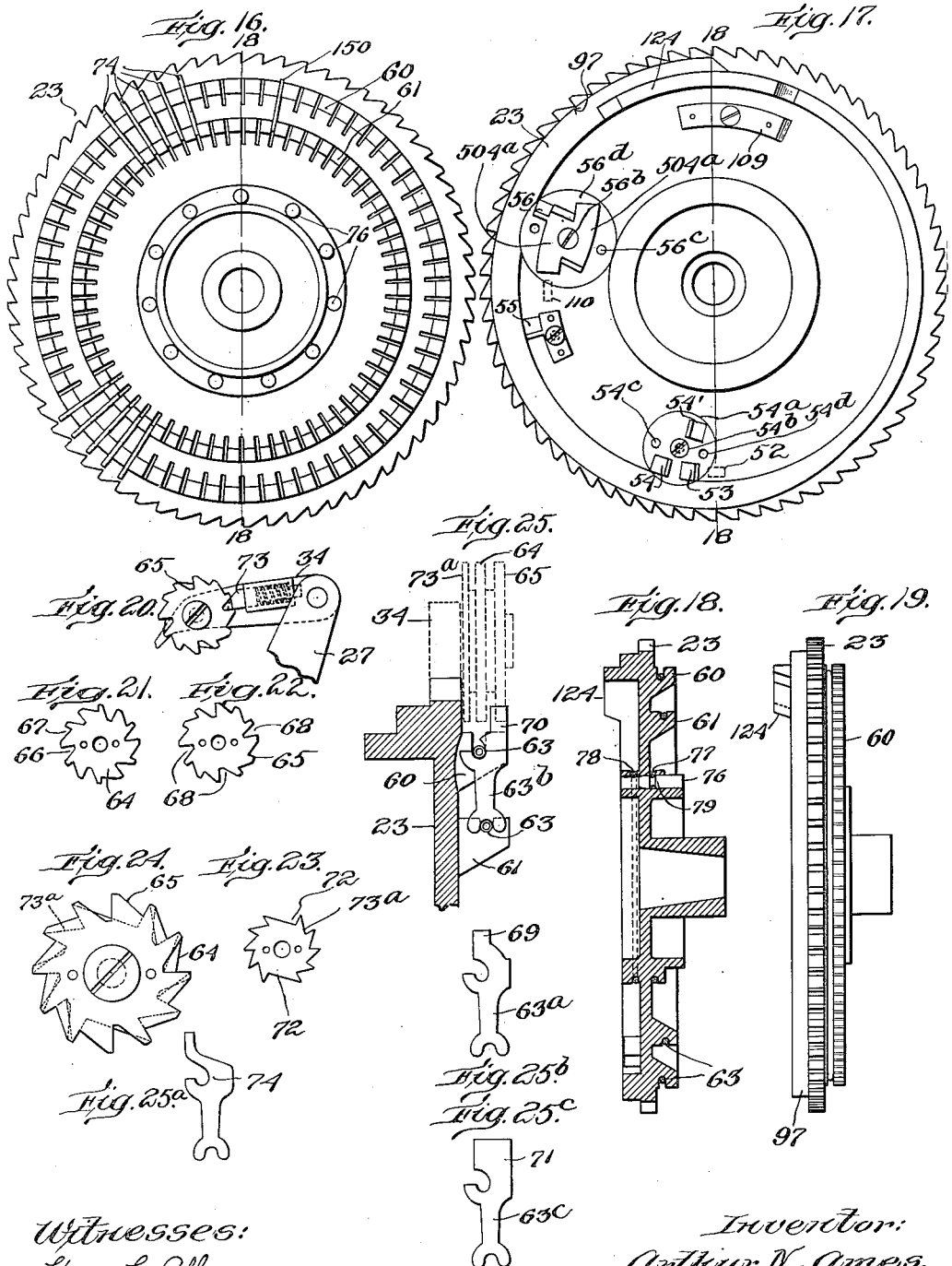

A. N. AMES.
KNITTING MACHINE.
APPLICATION FILED JUNE 26, 1911.
1,052,677.
Patented Feb. 11, 1913.
18 SHEETS—SHEET 10.
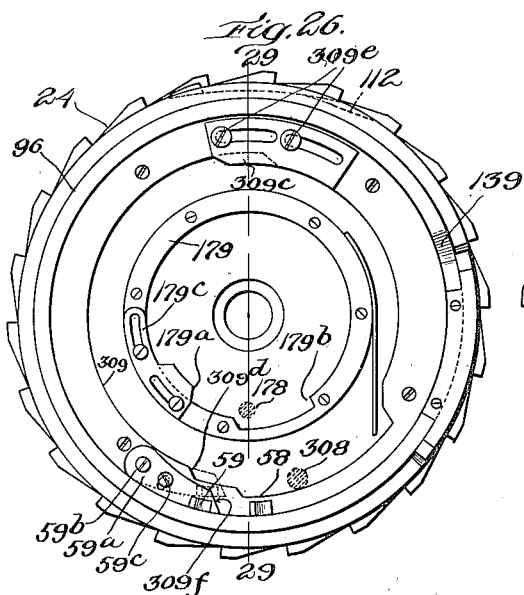
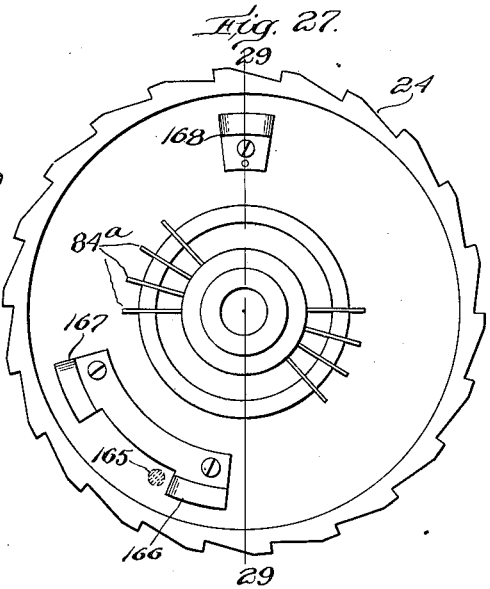
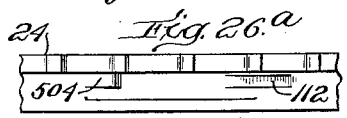
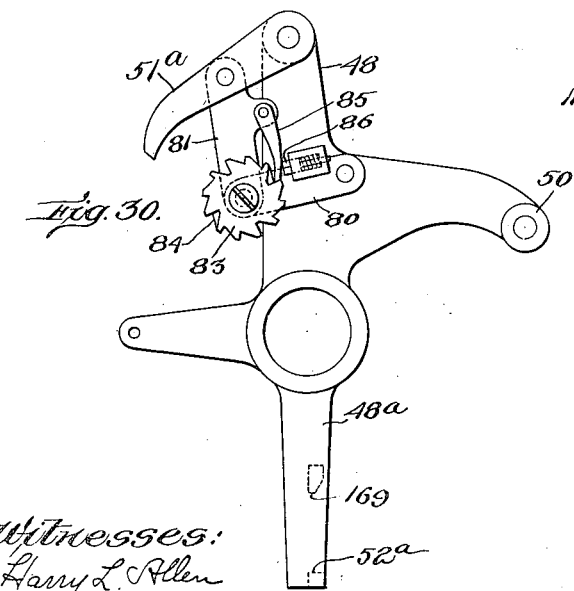
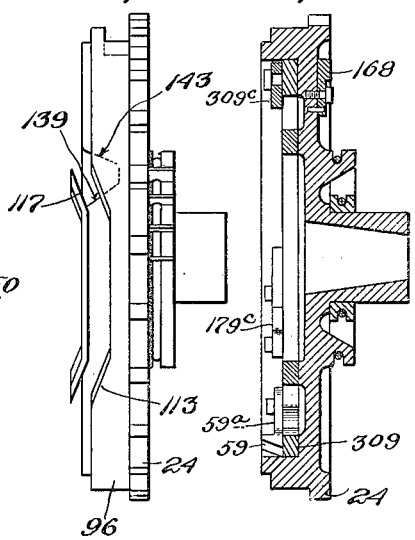
Witnesses:
Harry L. Allen
P. W. Pezzetti
Inventor:
Arthur N. Ames,
by Wright Brown Quinby May
Attys.

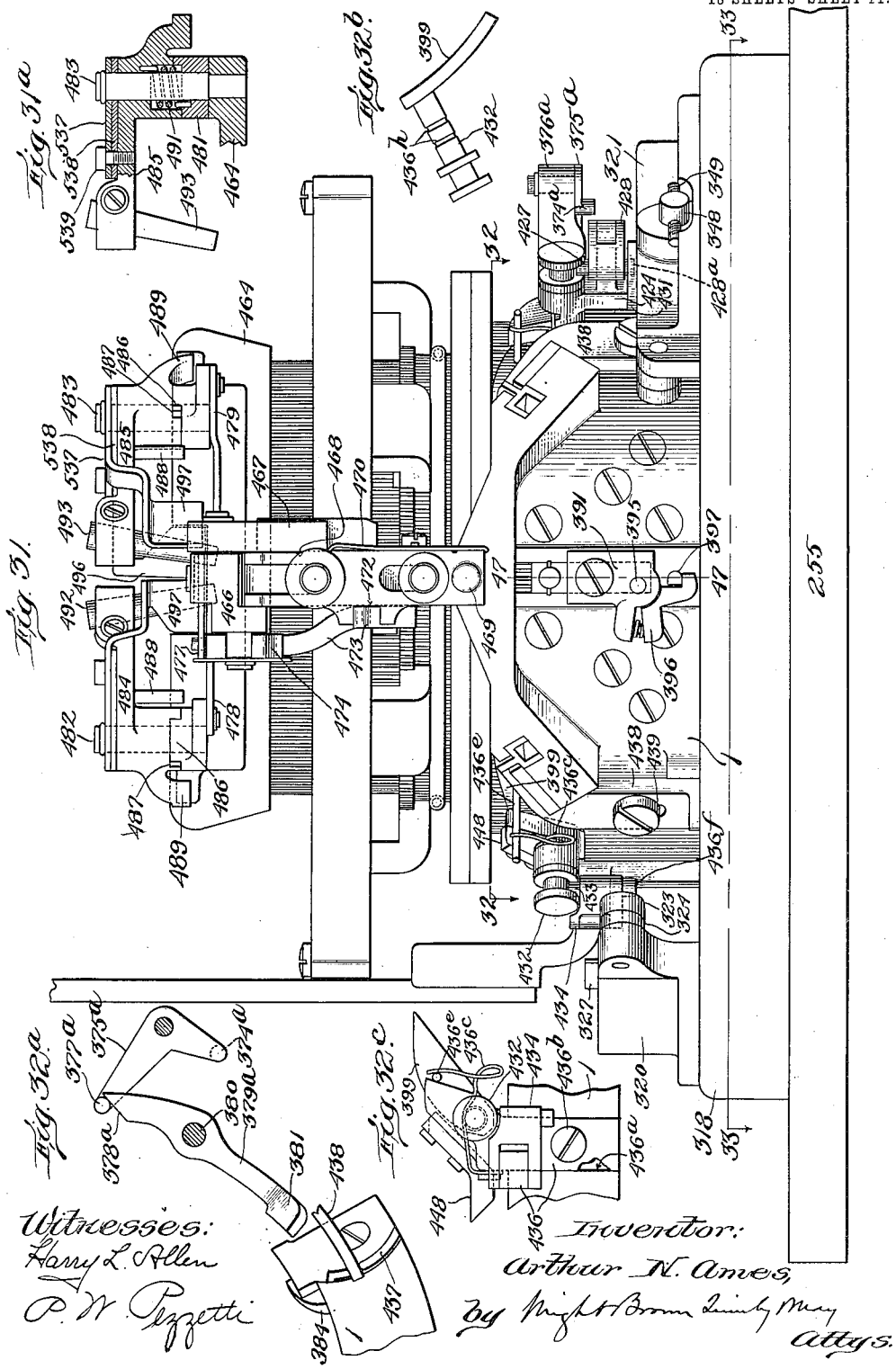

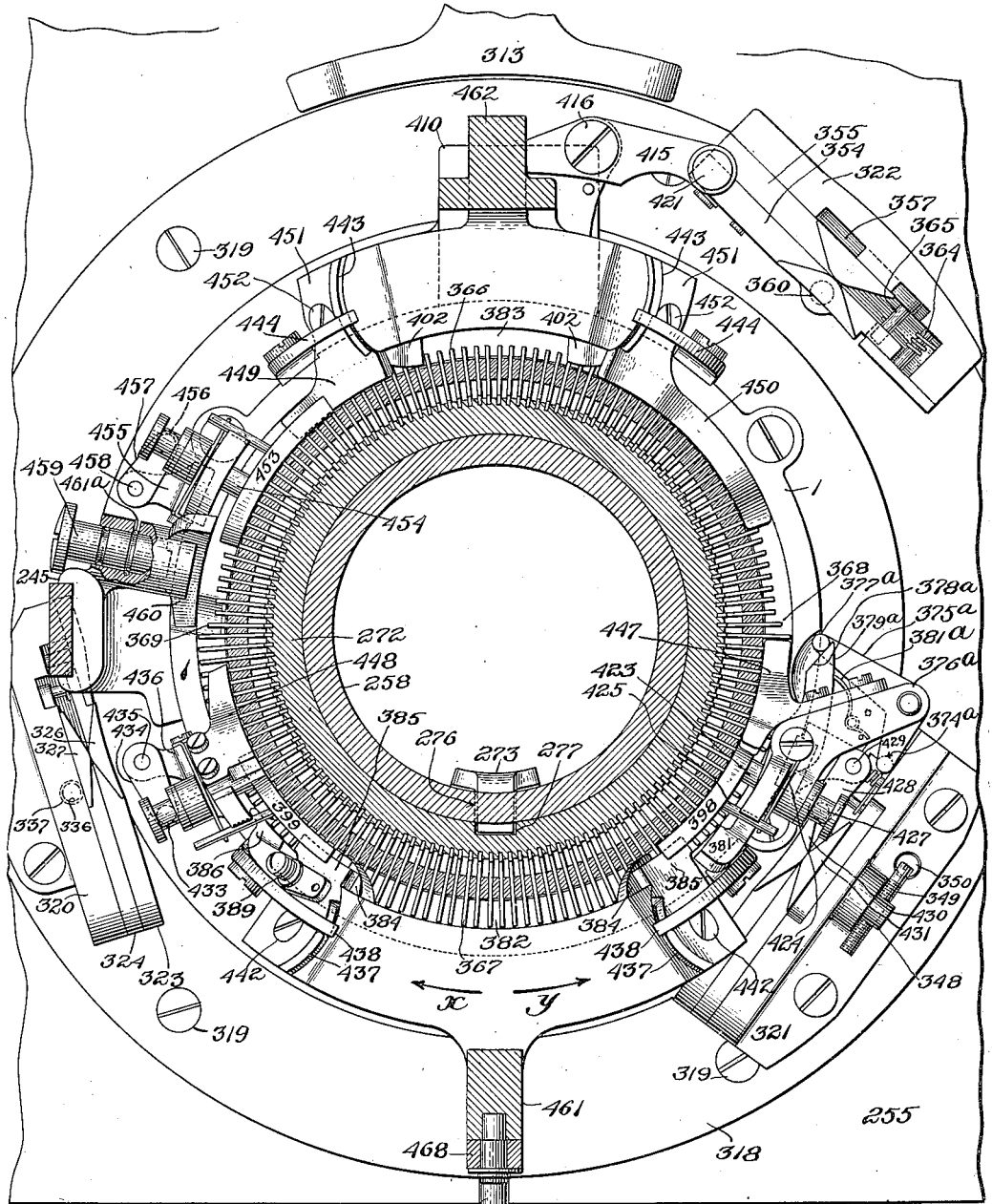

A. N. AMES.
KNITTING MACHINE.
APPLICATION FILED JUNE 26, 1911.
1,052,877.
Patented Feb. 11, 1913.
18 SHEETS—SHEET 14.
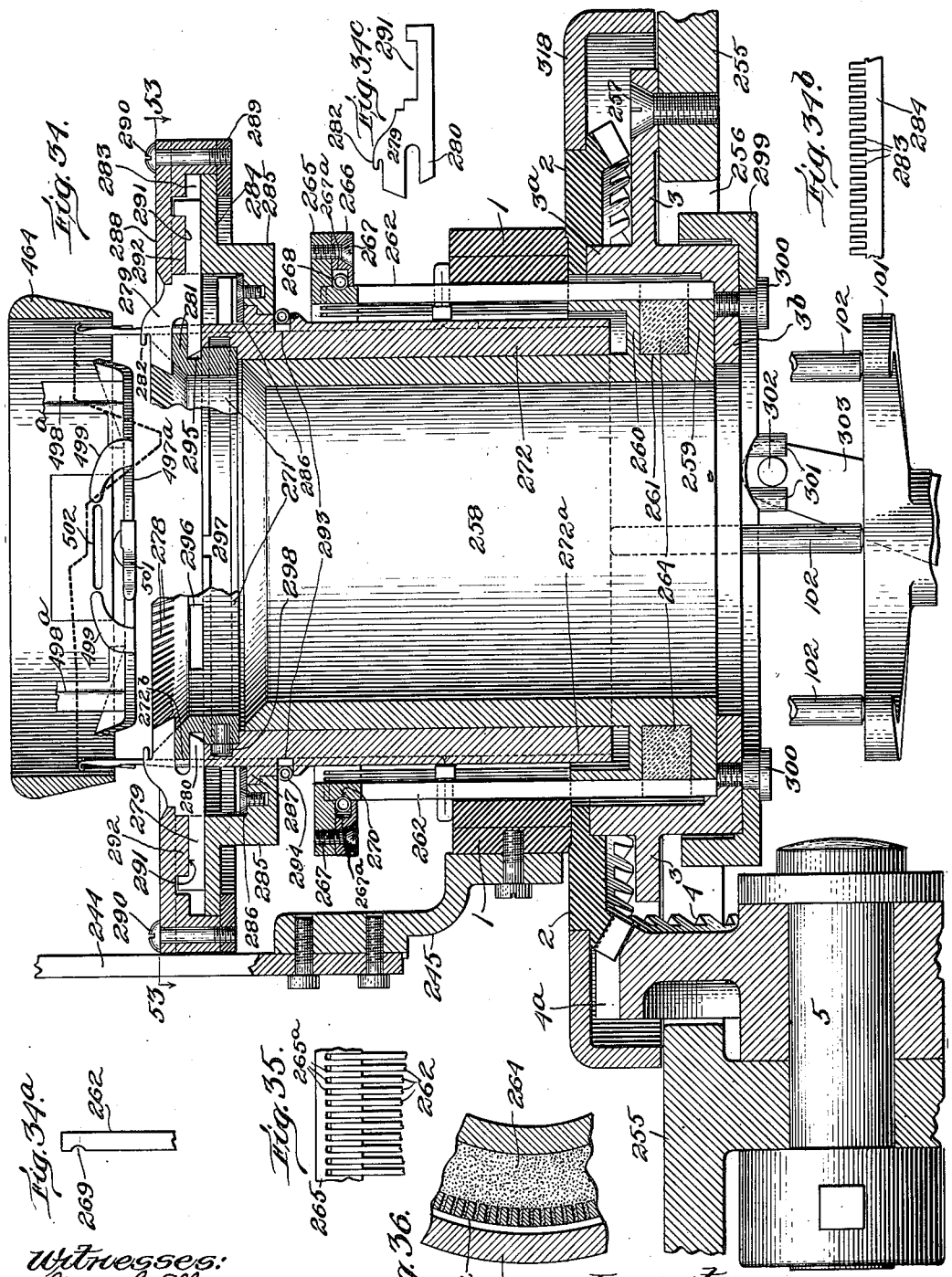

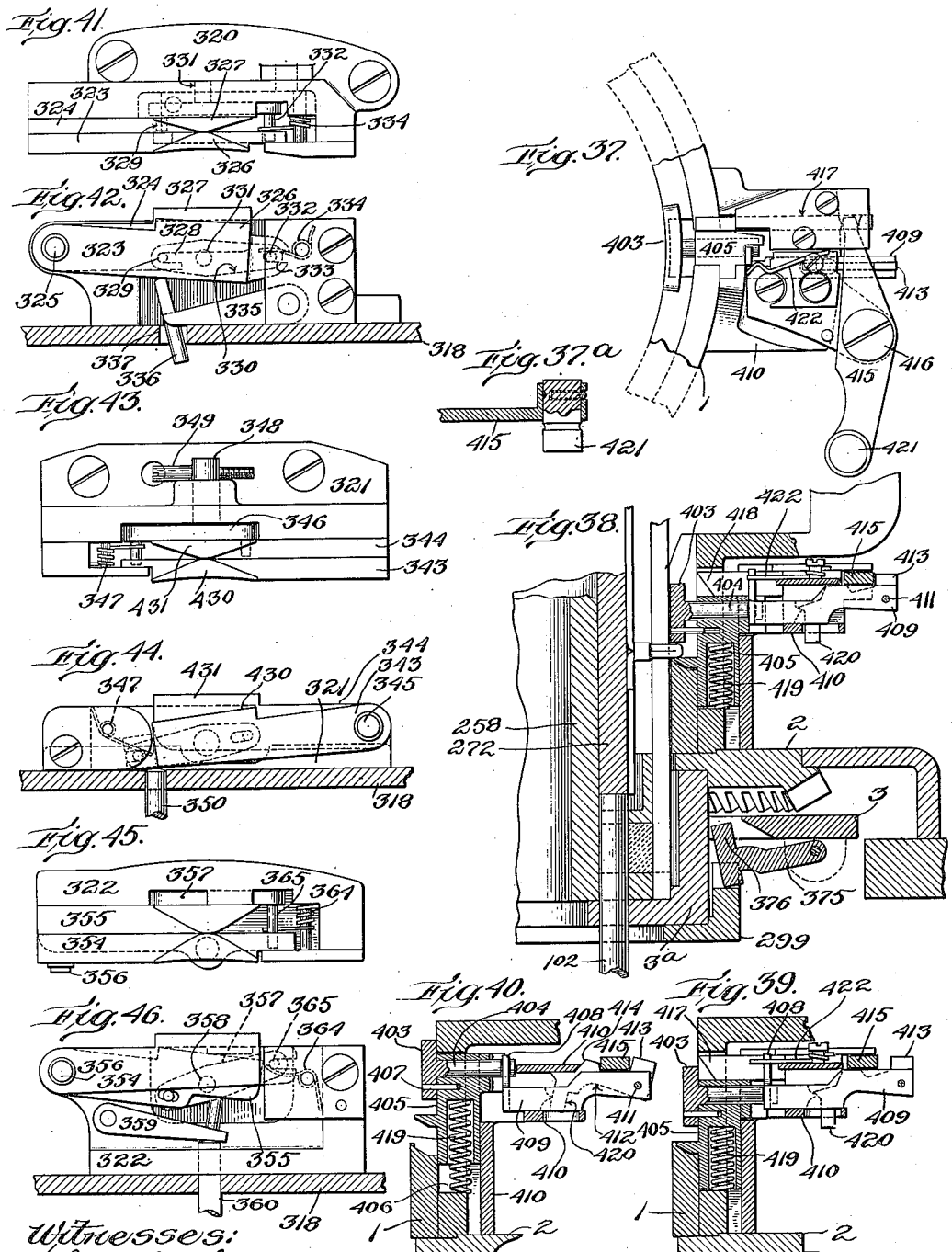

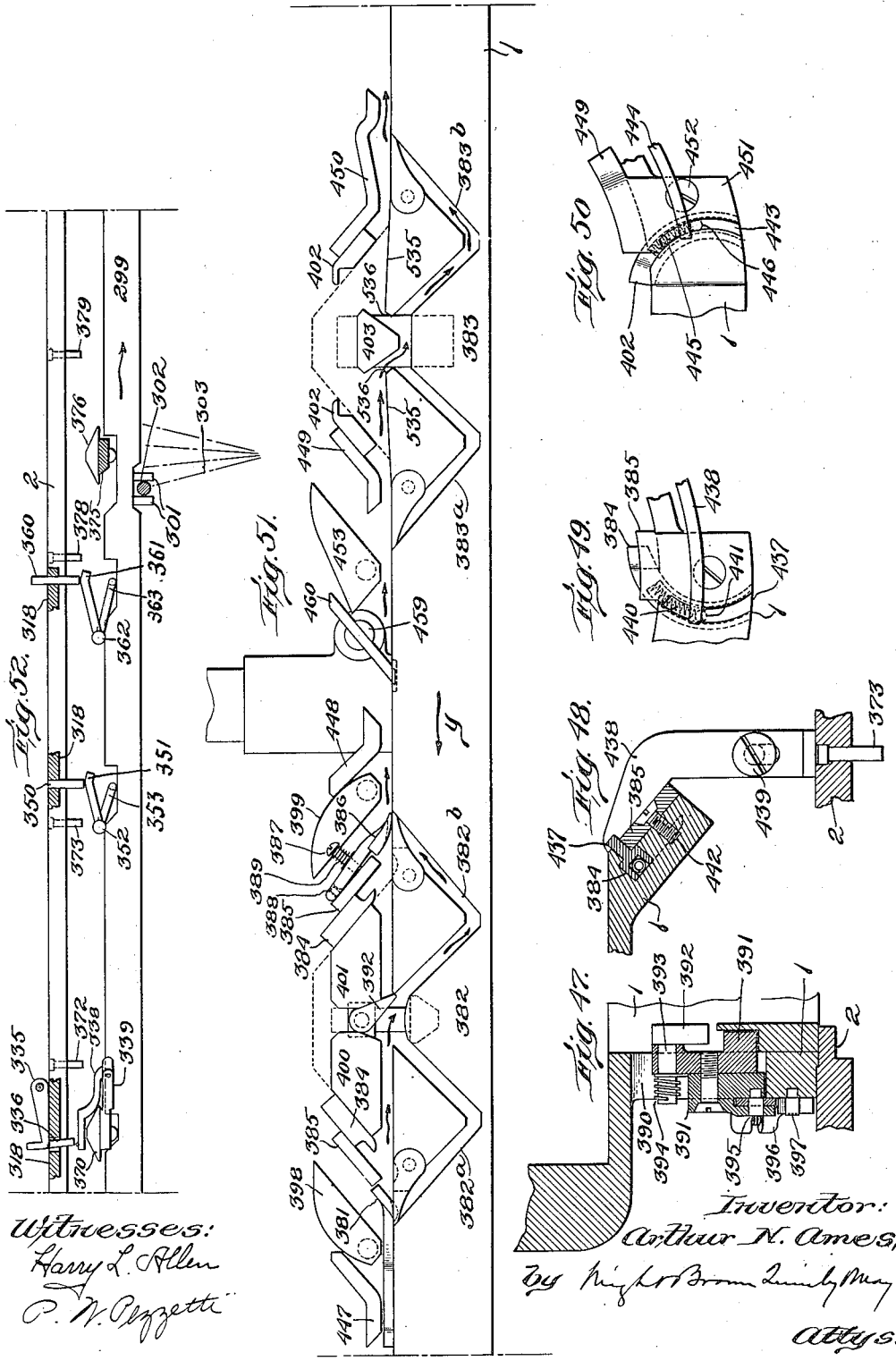

A. N. AMES.
KNITTING MACHINE.
APPLICATION FILED JUNE 26, 1911.

1,052,877.

Patented Feb. 11, 1913.
18 SHEETS—SHEET 17.

Witnesses:
Harry L. Allen
P. N. Cizzetti

Inventor
Arthur N. Ames,
by Wright Brown Quinby May
Attys.

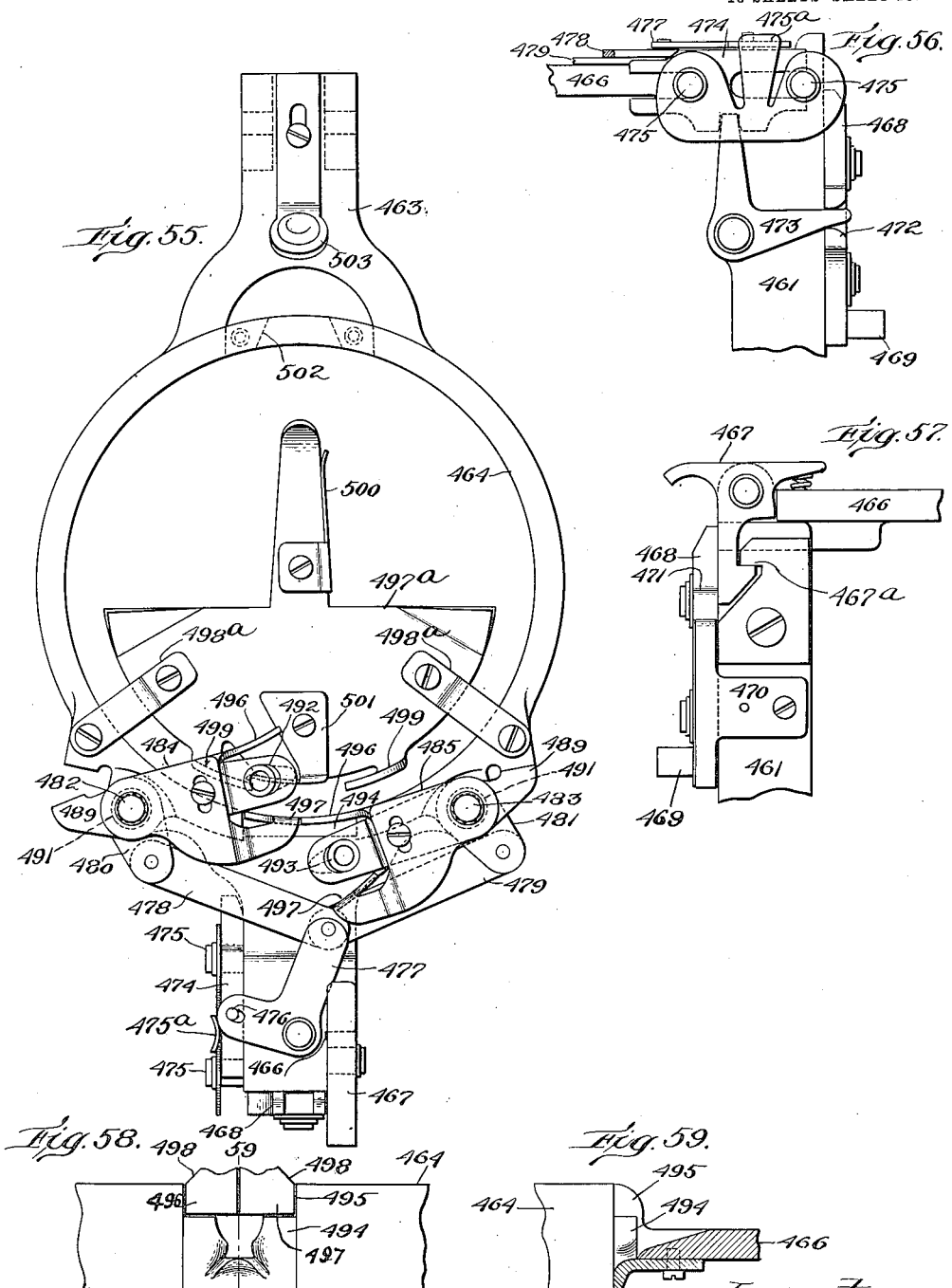

UNITED STATES PATENT OFFICE.

ARTHUR N. AMES, OF FRANKLIN, NEW HAMPSHIRE, ASSIGNOR TO A. N. AMES KNITTING MACHINE CO., OF FRANKLIN, NEW HAMPSHIRE, A CORPORATION OF MAINE.

KNITTING-MACHINE.

1,052,877. Specification of Letters Patent. Patented Feb. 11, 1913.

Application filed June 26, 1911. Serial No. 635,245.

*To all whom it may concern:*

Be it known that I, ARTHUR N. AMES, a citizen of the United States, residing at Franklin, in the county of Merrimack and State of New Hampshire, have invented certain new and useful Improvements in Knitting-Machines, of which the following is a specification.

This invention relates to knitting machines, especially of the circular type, said machine being designed particularly for knitting stockings, although I do not limit myself, in all features of my invention, to hosiery knitting machines.

The improved machine illustrated in the accompanying drawings produces a seamless stocking having a high spliced portion at the back of the ankle.

One of the objects of the invention is to provide a machine which is capable with but slight adjustments, of producing a large variety of stockings including not only a high spliced article as just mentioned, but also an ordinary split foot stocking having a white heel, sole and toe, an ordinary plain foot stocking with the heel and toe of the same color as the leg and foot or of different color, a one-color stocking with reinforced heel and toe with the leg knit with a double feed, or a one-color stocking with reinforced heel and toe and with the leg and foot knit with a single feed. And other varieties may be knit, as hereinafter explained.

Other objects of the invention are to provide a machine of this character having various improvements in the operating and controlling mechanisms, all tending to the production of a variety of kinds of work, and to facilitate operation, increase durability, and permit of readily made repairs.

To these ends the invention consists in the novel features of construction and peculiar mode of operation set forth in the following description and pointed out and defined in the claims.

The machine herein shown is adjusted to knit a stocking having a high-spliced heel and a double sole, the heel proper and toe being as usual. In the operation of the machine the leg of the stocking down as far as the beginning of the high splice is knit with a double feed by a continuous rotary motion of the cam cylinder, knitting two courses simultaneously, and then starting the high splice one of the two thread guides is thrown out and a third thread guide substituted therefor while the movement of the cylinder is changed from continuous rotary to reciprocating movement. The new thread guide at this time supplies a double thread for knitting the high splice at the back of the ankle, while the other guide, that is, the one continued from the leg of the stocking supplies the thread for knitting the front portion of the ankle, the courses of the two fabrics knit from the two feeds being interlocked at each side of the ankle in the peculiar manner described hereinafter. At the completion of the high splice the reciprocating motion of the cam cylinder is continued throughout the knitting of the heel, which is knit by narrowing and widening in the usual fashion but the machine is so constructed that if desired an additional thread may be automatically added for reinforcing the heel and toe, this reinforcing thread being thrown out or removed at the completion of the heel and toe. The machine then knits the foot of the stocking with reciprocating motion of the cam cylinder and two feeds of thread from one of which thread feeds, the top of the foot, or instep, is knitted, and from the other the bottom of the foot or sole, the courses of the instep being interlocked with those of the sole along each side of the foot in the peculiar manner hereinafter described. The knitting of the sole of the foot is done with the same thread or doubled thread that is used to knit the high splice, and therefore the stocking is made with a double or reinforced sole. After completing the foot of the stocking the machine knits the toe as usual, the reciprocating motion of the cam cylinder being continued until the completion of the toe. It will thus be seen that only the leg of the stocking is knit by continuous rotary motion of the cam cylinder, and that beginning with the high splice and extending to the toe the stocking is made up of two fabrics having their course interlocked at the sides of the stocking.

When the machine is adjusted as illustrated in the drawings, such a stocking as shown in Figure 1 will be made, *a* being the leg, *b* the high splice portion of the ankle and *b'* the front portion of the ankle, *c* the heel, *d* the sole of the foot, *d'* the instep of the foot and *e* the toe. By certain adjustments hereinafter described, the machine may be adapted to knit stockings like that shown in Fig. 2, or like those shown in Figs. 3, 3ª and 3ᵇ. The stocking shown in Fig. 2 is a high spliced seamless stocking which may have a reinforced heel and toe, while the stocking shown in Fig. 3 is an ordinary split foot stocking, the heel and toe of which may be knit the same color as, or of a different color than, the foot and leg. The stocking shown in Fig. 3ª is an ordinary plain foot stocking with reinforced heel and toe, and with the leg and foot knit with a double or single feed. Fig. 3ᵇ shows a stocking the same as the stocking of Fig. 3ª but without reinforced heel and toe.

Figure 8:
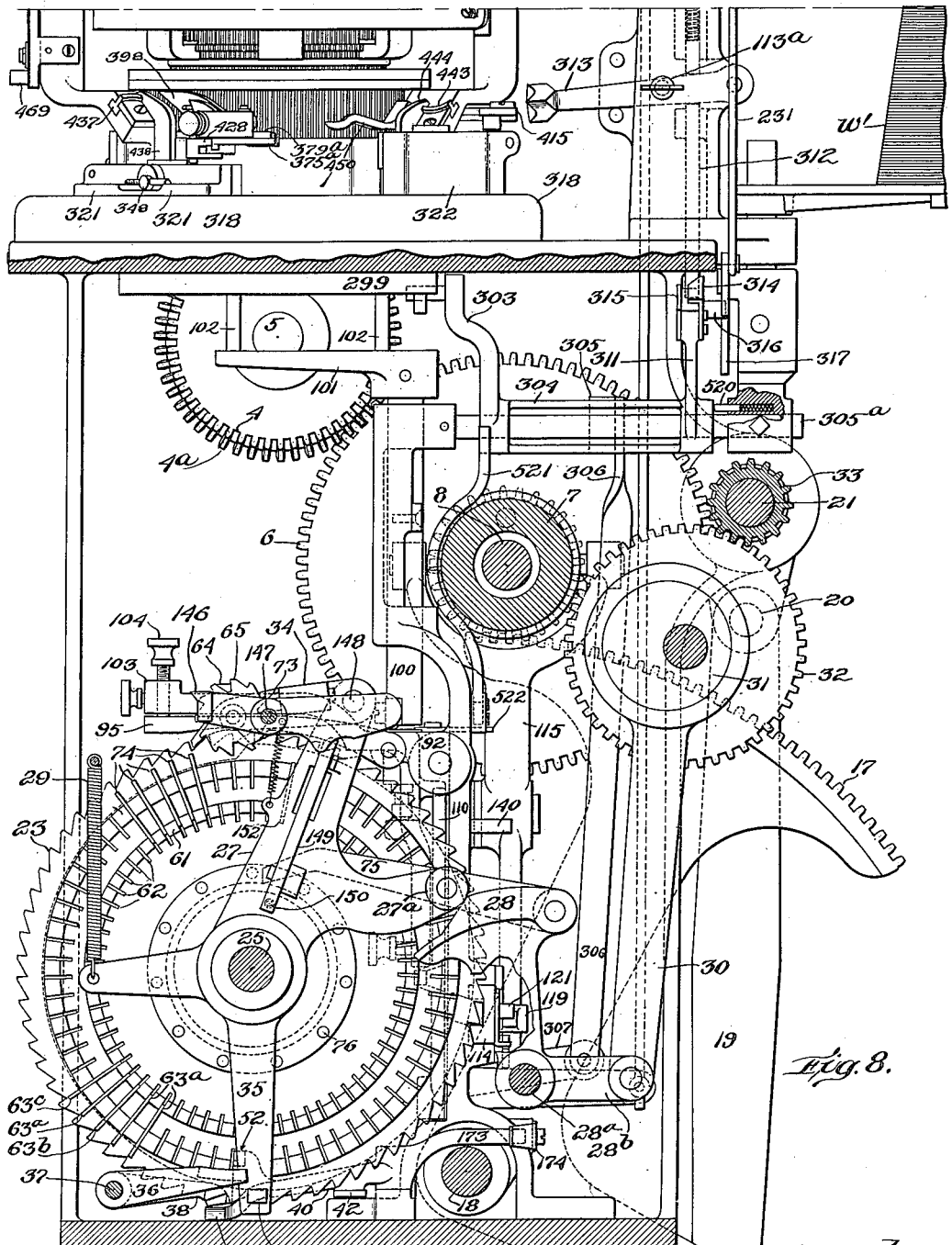
Figure 10:
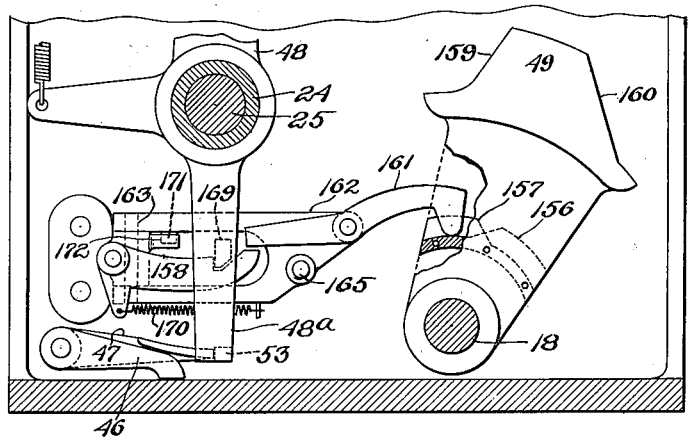
Figure 9:
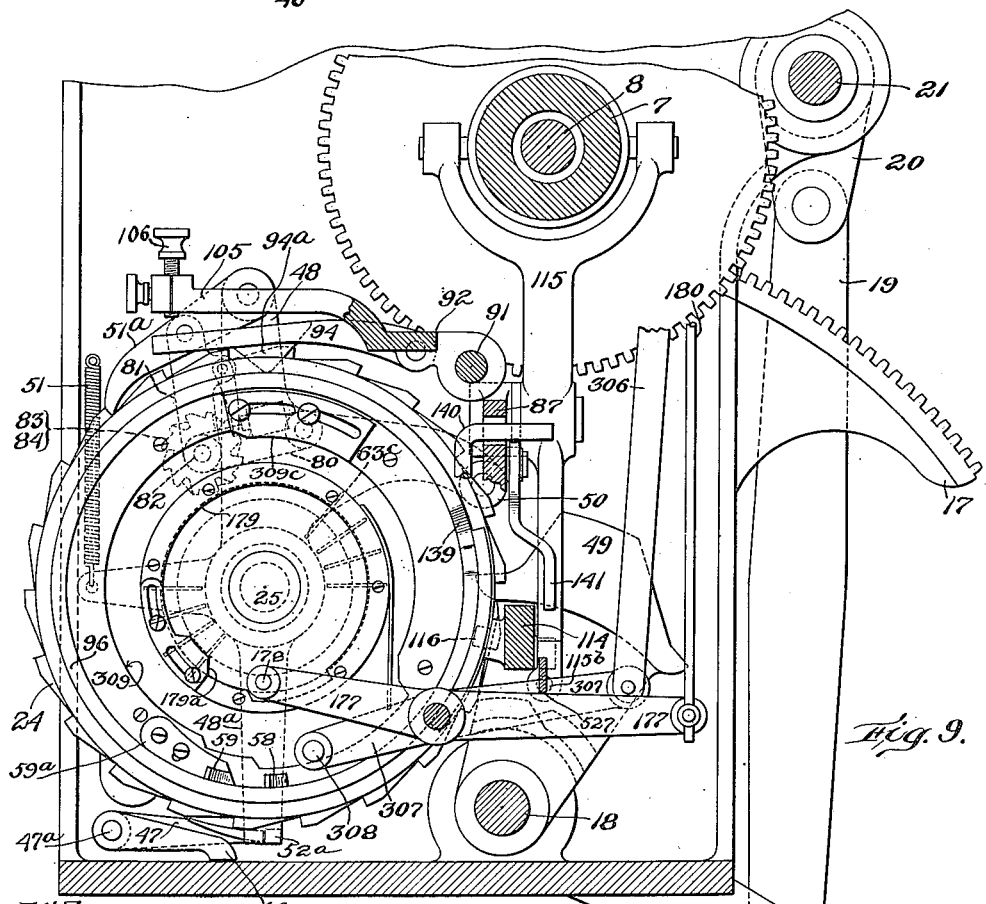
Figure 33:
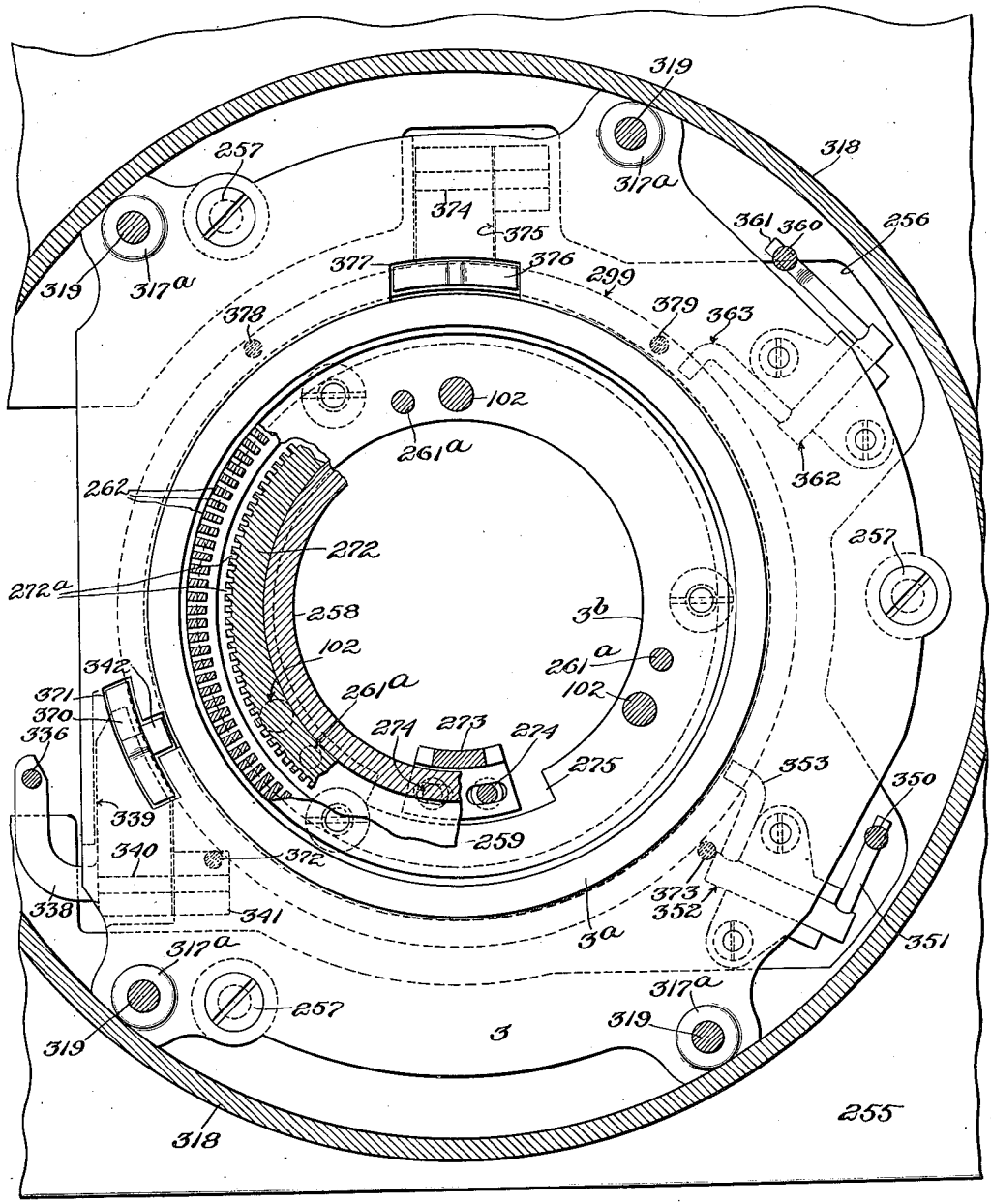
Figure 53:
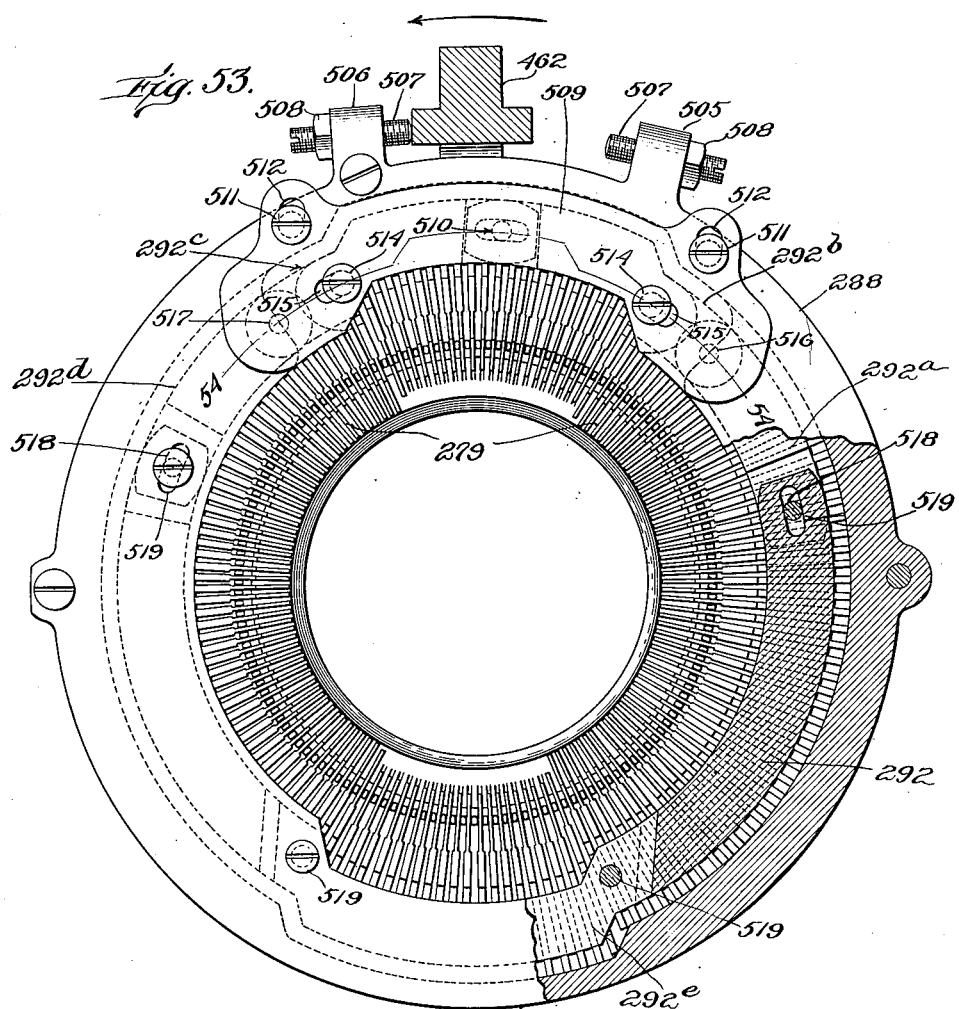
Figure 54:
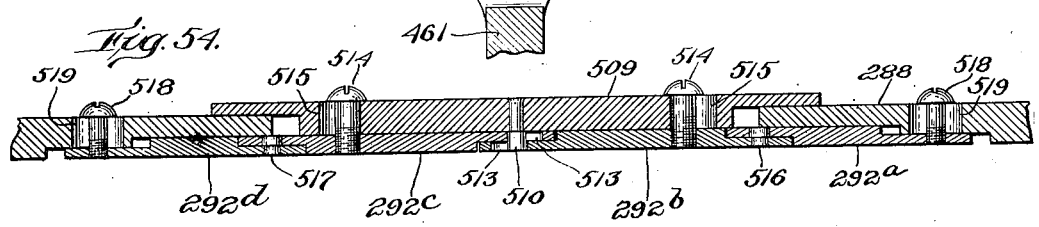

In the accompanying drawings, Figs. 1, 2, 3, 3ª and 3ᵇ show several different styles or kinds of stockings which may be made by my improved knitting machine. Fig. 4 is a side elevation of my improved knitting machine, on a smaller scale than the succeeding figures. Fig. 5 is a front view partly broken away and in section of the lower part of the machine shown in Fig. 4. Fig. 6 is a rear elevation of a portion of the mechanism shown in Fig. 4. Fig. 7 is a detail perspective of part of the mechanism shown in Fig. 6. Fig. 8 is a section on line 8—8 of Fig. 5, viewed in the direction of the arrow. Fig. 9 is a partial vertical section on a plane indicated by the arrow 9 of Fig. 5. Fig. 10 is a sectional detail showing part of the controlling devices hereinafter described. Fig. 11 is a detail relating to the mechanism for controlling the movements of the cam cylinder. Fig. 12 is a section on line 12—12 of Fig. 5. Figs. 13 and 14 are details of parts of the belt-shifting devices. Fig. 15 is a partial section on line 15—15 of Fig. 4. Figs. 16 and 17 are views from opposite sides of one of the controller wheels hereinafter described. Fig. 18 is a section on line 18—18 of Figs. 16 and 17. Fig. 19 is an edge view of the controller wheel shown in Figs. 16 and 17. Fig. 20 is an elevation of a portion of the actuator for the wheel shown in Figs. 16 and 17. Figs. 21, 22 and 23 are details relating to the devices shown in Fig. 20. Fig. 24 illustrates the wheels of Figs. 21, 22, and 23 assembled and on a larger scale. Fig. 25 represents a section of a part of Fig. 16 and showing a jack in connection therewith. Fig. 25ª illustrates one of the pawl plates. Figs. 25ᵇ and 25ᶜ illustrate two forms of jacks differing from the one shown in Fig. 25. Figs. 26 and 27 are elevations from opposite sides of the other controller wheel of the machine shown in Fig. 4. Fig. 26ª is a detail edge view of a portion of the wheel shown in Fig. 26. Fig. 28 is an edge view of the controller wheel of Figs. 26 and 27. Fig. 29 is a section on line 29—29 of Figs. 26 and 27. Fig. 30 is a detail of the actuator for the wheel of Figs. 26 and 27. Fig. 31 is a front elevation of a portion of the machine adjacent the cam cylinder. Fig. 31ª is a detail, partly in section, of a portion of Fig. 31. Fig. 32 is a section on the line 32—32 of Fig. 31. Figs. 32ª, 32ᵇ, and 32ᶜ are details of the cam cylinder. Fig. 33 is a partial section on the line 33—33 of Fig. 31. Fig. 34 is a section on line 34—34 of Fig. 4. Figs. 34ª, 34ᵇ and 34ᶜ are details hereinafter described. Figs. 35 and 36 are fragmentary details of parts shown in Fig. 34. Figs. 37, 37ª, 38, 39, and 40 are details relating to one of the needle controlling cams of the cylinder. Figs. 41 to 46 inclusive are details of the controlling devices hereinafter described for certain of the cams carried by the cylinder, said devices being mounted in the frame of the machine adjacent the cylinder. Fig. 47 is a section on line 47—47 of Fig. 31. Figs. 48, 49 and 50 are details relating to the droppers and lifters. Fig. 51 is a development of the cam cylinder. Fig. 52 is a diagrammatic development of the cam ring hereinafter described and parts directly controlled thereby. Fig. 53 is a partial section on line 53—53 of Fig. 34. Fig. 54 is a section on the curved line 54—54 of Fig. 53. Fig. 55 is a plan view of the latch ring. Figs. 56 and 57 are details relating to the latch ring of Fig. 55. Fig. 58 is a view from the inside of the latch ring of Fig. 55, showing one of the throat plates. Fig. 59 is a section on line 59—59 of Fig. 58.

Having reference to the drawings, 1 represents the cam cylinder to the under side of which is secured a bevel gear 2 rotatably supported by a bed plate 3 and (Fig. 34) driven by bevel gear 4, compounded with a spur gear 4ª. The spur gear 4ª is loosely mounted on a stud 5 and is driven by a larger gear 6 (Figs. 6 and 8). Two trains of mechanism are provided for driving the gear 6, one for imparting an oscillating motion thereto so as to reciprocate the cam cylinder, and the other so as to continuously rotate said gear and cylinder 1, in one direction. The gear 6 is made with a hub 7 (Fig. 15) loosely mounted on an axle 8 with provision for limited endwise movement. The ends of the hub of gear 6 are clutch members and coöperate with clutch members 9 and 10 both loosely mounted in bearings on the frame of the machine and loosely surrounding axle 8. Clutch member 10 has fixed to it a pinion 11 meshing with a gear 12 that is compounded with a gear 13 in mesh with a gear 14 fixed to a driving pulley 15. The pulley 15 is rotatably supported by a bearing sleeve 16 forming part of a bracket secured to the frame of the machine. This is a structural feature of some importance, since the interposed sleeve 16 separates the parts 10 and 15 which rotate at different speeds. The clutch member 9 is loosely mounted on axle 8 within a bearing on the frame of the machine, and is formed with a pinion 9ª in mesh with a segment 17 fixed to a rock shaft 18. Segment 17 is connected by a link 19 with a crank 20 fast on a shaft 21 to which the gears 12 and 13 are also fastened (Figs. 6, 8, 9, and 15). The clutch member 10 has fixed to it a pulley 22 arranged alongside pulley 15 so that the driving belt can be shifted back and forth from one pulley to the other. When the driving belt is on pulley 22 and hub 7 is in engagement with clutch member 10 the gear 6 will be driven continuously in one direction at relatively slow speed from pulley 22 through member 10 direct to gear 6, but when the driving belt is on pulley 15 gear 6 will be driven in the same direction and at a relatively high speed from pulley 15 through gears 14, 13, 12 and 11 and clutch member 10. When the belt is on pulley 22 and hub 7 is in engagement with clutch member 9, said member and gear 6 are oscillated or rocked back and forth by segment 17 which is driven through link 19, crank 20, shaft 21, gears 12 and 11, member 10 and pulley 22, the hub 7 being at this time unclutched from the inner end of member 10.

The entire automatic action of my machine is controlled by two wheels 23 and 24 (see Figs. 5, 6, 8, 9, 12, and 16 to 29), each formed at its periphery as a ratchet wheel. These control wheels 23 and 24 are rotatably supported by cone-shaped studs 25 which are fixedly but adjustably mounted in the frame of the machine with their outer ends threaded and provided with nuts 26. By means of the nuts 26 the studs 25 may be frictionally wedged into wheels 23 and 24 sufficiently to prevent too free movement or racing of said wheels when actuated as hereinafter described. On the hub of wheel 23 (Figs. 8 and 12) is loosely pivoted a vibrating actuator 27 for said wheel, which is swung in one direction by a cam lever 28 fulcrumed at 28ª upon a stud projecting from the frame of the machine and engaging a cam roll 27ª on actuator 27, and in the opposite direction by a spring 29. An arm 28ᵇ on cam lever 28 is connected by a pitman 30 with an eccentric 31 loosely mounted on a stud projecting from the frame of the machine. The eccentric 31 is compounded with a gear 32 driven by a pinion 33 formed upon the inner end of the hub of gear 12 (Fig. 15). The actuator 27 carries a pawl 34, (Figs. 8 and 20), coöperating with the teeth of controller wheel 23 so that when actuator 27 is vibrated said wheel is rotated step by step.

Actuator 27 is made with a depending arm 35 coöperating with a latch 36 pivoted at 37 upon the frame of the machine. The latch 36 is made with an arm 38 coöperating with a cam or wedge 39 provided upon the forward end of a lever 40 (Figs. 8 and 12) that is pivoted at 41 upon the frame of the machine. The lever 40 is connected by a link 42 with another lever 43, substantially a counterpart of lever 40, which is pivoted at 44 upon the frame of the machine. This lever 43 is made at its forward end with a cam or wedge 45 coöperating with an arm 46 forming part of a latch 47 pivoted at 47ª to the frame of the machine. The latch 47 coöperates with the depending arm 48ª of an actuator 48, (Figs. 9, 12 and 30) which operates the controller wheel 24, and this actuator is fulcrumed loosely upon the hub of said wheel. A cam lever 49 fixed to rock shaft 18 coöperates with a cam roll 50 on actuator 48 to swing the latter in one direction while a spring 51 swings the actuator back or in the opposite direction. In this way said actuator is vibrated and acts through a pawl 51ª carried by it to rotate wheel 24 step by step so long as the actuator is free to vibrate. The depending arms 35 and 48ª are made, respectively, with lugs 52 and 52ª to be engaged by the latches. The lever 40 is made with a finger 52ᵇ coöperating with cams 53, 54, 55 and 56 on control wheel 23, and whenever during the movement of said wheel one of these cams strikes the finger 52ᵇ, the lever 40 is swung on its pivot 41 away from arm 38 of latch 36 allowing the latter to fall by gravity into the path of lug 52 to lock actuator 27 against vibration. This movement of lever 40 acts through link 42 to simultaneously throw lever 43 of control wheel 24 toward the latter so as to carry a finger 57 on lever 43 into the path of travel of two cams 58 and 59 on wheel 24 and thrust the wedge cam 45 under arm 46 thereby raising latch 47 out of the path of lug 52ª on actuator 48ª and freeing the latter so that it can be operated by cam 49 and spring 51. When the cams 58 and 59 engage the finger 57 of lever 43 during the rotation of control wheel 24, the lever 43 is thrown out of coöperative relation with wheel 24 and at the same time it acts through link 42 to throw lever 40 back into coöperative relation with its wheel 23. One or the other of the two wheels 23 and 24 is in control of the operation of the machine at all times and as the machine operates the control is shifted, by the cams 53, 54, 55 and 56, Fig. 17, and cams 58 and 59, Figs. 9 and 26, back and forth as required by the work being done, each control wheel being automatically thrown into action by the other wheel when the latter stops, or in other words each wheel automatically throws itself out of action when it starts the other.

The cams 53, etc., on the wheels 23 and 24 are appropriate to the production of the stocking shown in Fig. 1, above described, but in order to enable the machine to be adjusted to produce other kinds of stockings, for example, stockings like those shown in Figs. 2, 3, 3ª and 3ᵇ, other cam structures on the wheels are provided as hereinafter explained.

Whatever form of stocking the machine is adjusted to produce, the wheel 23 controls and determines the number of courses in the leg and foot, while the wheel 24 controls and determines the number of courses in both the heel and toe. Therefore the length of the leg and high splice, the sizes of the heel and toe and the length of the foot depend upon and are governed by the speed relation between control wheels 23 and 24 and the cam cylinder 1. Herein I have provided for varying this speed relation as the work to be done by the machine may require, and to this end the control wheel 23 is made with two annular flanges 60 and 61 (Figs. 8, 16, 18 and 19) formed with radial slots 62 to receive jacks 63ª, 63ᵇ and 63ᶜ, (Figs. 25, 25ᵇ, 25ᶜ) that are removably held in place within the slots by endless elastic bands 63 occupying annular grooves in the sides of the flanges. These elastic bands may be made from a length of coiled spring having its ends secured together, and while occupying the annular grooves of the wheel they can be stretched to permit of the insertion and removal of the jacks. These jacks coöperate with a pair of toothed ratchet like jack wheels 64 and 65 (Figs. 8, 20, 21 and 22) rotatably mounted on the pawl 34. The jack wheel 64 is made with twelve teeth and with regularly alternating deep and shallow alternating recesses 66 and 67 between said teeth, while the jack wheel 65 is made with a corresponding number of teeth but with only four equally spaced and relatively deep recesses 68. The outer ends 69 of the jacks 63ª are offset in such direction, and are of such width, as to engage only with the wheel 64, while the outer ends 70 of the jacks 63ᵇ are offset in another direction and are of such width as to engage only with the wheel 65. The outer ends 71 of the jacks 63ᶜ are made wide enough to engage both wheels 64 and 65. The flanges 60 and 61 carry the jacks, etc., past the wheels 64 and 65 during the operation of the machine, so that the jacks successively rotate said wheels a distance equal to the spacing of the teeth of the latter. Each time the spring 29 throws actuator 27 back while a jack 63ª occupies its operative position, the outer end of said jack will engage wheel 64 and turn the latter to the extent of one tooth, and at the same time if said jack enters one of the relatively shallow recesses of wheel 64 the latter will climb up onto the jack so that the pawl 34 cannot drop behind the next tooth of the controller wheel 23 and consequently when actuator 27 is thrown forward by cam lever 28 the pawl will skip said next tooth on wheel 23 and the position of the latter will not be disturbed by the pawl. Whenever during the back movement of pawl 34 the jack 63ª enters a relatively deep recess 66 of wheel 64, the wheels 64 and 65 have a step movement imparted to them as before, but, owing to the depth of the recess 66, the jack has no elevating effect on the wheels 64 and 65 and consequently on the next forward movement of pawl 34 wheel 23 will be actuated thereby. The jacks 63ᵇ coöperate in the same fashion with the relatively deep and shallow recesses of wheel 65, but owing to the fact that the shallow recesses of wheel 65 are arranged in pairs alternating with the deep recesses of said wheel, each jack 63ᵇ will act through wheel 65 to hold the pawl 34 elevated and inoperative during two vibrations of actuator 27, or in other words, a jack 63ᵇ has double the retarding effect on wheel 23 that a jack 63ª has. The two wheels 64 and 65 are fastened together with their recesses and teeth coinciding or registering, but with two diametrically opposite relatively deep recesses of wheel 64 registering with two relatively deep recesses of wheel 65 so that only two pairs of registering deep recesses are accessible to a jack 63ᶜ throughout the peripheries of wheels 64 and 65. As a result pawl 34 will be held in its elevated and inoperative position by a jack 63ᶜ engaging one or the other of wheels 64 and 65 until one of the two pairs of registering deep recesses engages said jack, whereupon pawl 34 feeds wheel 23 one step, and as will be clear a jack 63ᶜ is capable of producing five times the retarding effect of a jack 63ª. That is, it is possible for a jack 63ᶜ to come into operative position relatively to wheels 64 and 65 at such a moment that it must engage five shallow recesses before the wheels 64, 65 present a pair of registering deep recesses thereto. A spring-pressed detent 73, (Figs. 8 and 20) yieldingly holds wheels 64 and 65 against movement by the jacks and prevents backward or racing movement of said wheels.

As the machine herein shown is constructed the actuator 27 moves the controller wheel 23 a step, or one tooth, for every six revolutions of the cam cylinder, and when the machine is operating it is under the control of the wheel 23 during the knitting of the leg and said wheel is intermittently actuated until the top of the high splice b is reached, at which time the wheel 23 has made only a partial revolution in this machine about two-thirds of a revolution. At this time the cam 56 (Fig. 17) acts through lever 40, link 42 and lever 43 to reverse the condition of the latches 36 and 47, so that wheel 23 is momentarily thrown out of action and wheel 24 into action. Wheel 24 then makes two step movements causing cam 59 (Fig. 26) on wheel 24 to act through lever 43, link 42 and lever 40, to throw wheel 24 out of action and wheel 23 back into action again. This stops wheel 24 and starts wheel 23 and the latter now continues to be rotated step by step until the knitting reaches the bottom of the high splice or beginning of the heel. At this time cam 55 (Fig. 17) acts through lever 40, link 42 and lever 43 to throw wheel 23 out of action and wheel 24 into action. The wheel 24, which is moved one step or tooth for each complete reciprocation of the cam cylinder, now completes the revolution started when it was first thrown into action, and the heel $c$ is knitted. At the completion of the heel the cam 58 on wheel 24 acts through lever 43, link 42 and lever 40 to throw wheel 24 out of action and wheel 23 into action again, whereupon wheel 23 nearly completes the revolution which it started to make at the beginning of the leg, when the cam 54 acts through the two levers and link to throw wheel 23 out of action and wheel 24 back into action again. The wheel 24 in starting upon this second revolution for the knitting of the toe causes the cam 59 to act through the levers and link to throw the control of the machine back on to the wheel 23, which is not desired at this stage of the knitting, but only at the beginning of the high splice; therefore I provide the cam 53 on the wheel 23 which, immediately the latter is started at this time, acts through the levers and link to throw wheel 23 out of action again and wheel 24 back into action, after which the latter wheel finishes its second revolution for the knitting of the toe. At the completion of the toe the wheel 23 is very nearly, but not quite, back to its starting point, and when the wheel 24 finishes its second revolution on the completion of the toe, the cam 58 acts through the levers and link to throw wheel 24 out of action and wheel 23 back into action again. Wheel 23 then makes one or more step movements and reaches its starting point, whereupon automatic means to be described later stops the machine. During this last partial movement of the wheel 23 the machine knits a few finishing courses $e'$ which are used in the operation of finishing and closing the toe.

From the description thus far given, it will be clear that by inserting or removing jacks 63$^a$, 63$^b$ and 63$^c$ at the proper points on wheel 23, the speed of wheel 23 relatively to the speed of the cam cylinder may be reduced or increased to lengthen or shorten the leg, high splice and foot of the stocking, as may be desired, and the length of either one of these parts of the stocking may be regulated independently of the other two parts.

The wheels 64 and 65 and their coöperating jacks constitute retarding devices for the wheel 23 which, as will be seen, have provision for a wide range of adjustment or variation to regulate the speed relation between the cam cylinder and the said wheel for any part of the stocking controlled by said wheel. In order to synchronize the rotations of the wheels 64 and 65 with relation to wheel 23 I provide a ratchet wheel 73$^a$ fastened to the wheels 64 and 65 and a set of pawl plates 74 (Fig. 25$^a$) which are adapted to be applied to wheel 23 in the same manner as the jacks above described, but which are shaped so as to coöperate only with wheel 73$^a$. These plates 74 act merely to rotate the wheel 73$^a$ and the wheels 64 and 65 connected with it and do not act to elevate the actuating pawl like the jacks. A sufficient number of these pawl plates 74 are applied to the wheel 23 in positions to engage wheel 73$^a$ during the last part of the rotation of wheel 23 so as to leave wheels 64 and 65 in proper position with relation to the first jack 63$^a$, 63$^b$, or 63$^c$ on wheel 23 with which they will coöperate when wheel 23 is started again at the beginning of the next stocking. The wheel 73$^a$ has ten teeth and two diametrically opposite relatively large spaces 72 which render the pawl plates 74 ineffective when one of said pawl plates 74 reaches one of these relatively large spaces 72 on wheel 73$^a$. To accord with the number of teeth provided on the wheels 64 and 65 herein shown I provide wheel 23 with five of the pawl plates 74, so that at no matter what point the first of the series of pawl plates 74 engages the wheel 73, the latter will be rotated step by step by the pawl plates but only far enough to bring one of the large spaces 72 into operative position with relation to one of the pawl plates 74 so that wheels 64 and 65 will always be started from the same position by the first jacks of the series of jacks on wheel 23.

In stockings of different kinds the length of the leg $a$ varies greatly, and in the production of some stockings it is desirable to omit knitting the leg altogether. For these reasons and others which will be apparent to those skilled in the art, I provide a boosting mechanism or mechanism for accelerating the speed of rotation of the wheel 23 beyond the capacity of the pawl 34 and actuator 27. This boosting mechanism consists of a pawl 75 (Fig. 8) pivotally mounted on the cam lever 28 and coöperating with a series of abutment pins 76 on wheel 23. These pins 76 are movably mounted in wheel 23, but normally held against movement by one or the other of two endless elastic bands 77 and 78 (Fig. 18) mounted in annular grooves provided on wheel 23 and engaging an annular groove 79 provided on each pin 76. Each pin 76 can be forced endwise so as to shift the groove 79 from one spring band 77 to the other spring band 78, or vice versa, and when said groove is in engagement with the band 77 the pin 76 projects from wheel 23 so as to be acted upon by pawl 75, but when groove 79 is in engagement with band 78 the pin is retracted beyond the reach of pawl 75. Thus by shifting the pins 76 the action of pawl 79 on wheel 23 may be regulated.

The actuator 48 of the wheel 24 has one end of a link 80 (Figs. 5, 9, and 30) pivotally connected with it whose opposite end is pivotally connected with another link 81 that is pivotally connected with pawl 51$^a$. The pivot pin 82 connecting the two links 80 and 81 rotatably supports two retarding wheels 83 and 84 which coöperate with jacks 84$^a$ (Fig. 27) on wheel 24, and which are similar to jacks 63$^a$, 63$^b$, and 63$^c$ on wheel 23. The wheels 83 and 84 are similar in construction and operation to the wheels 64 and 65 and they coöperate with the jacks 84$^a$ in the manner already described in connection with wheel 23. Also the jacks 84$^a$ are mounted on the wheel 24 in the same manner that the jacks already described are mounted on wheel 23. The wheels 83 and 84 are held against accidental and backward movement by a detent 85 against which a spring-pressed plunger 86 acts (see Fig. 30).

Between the two wheels 23 and 24 is a standard or bracket 87 (Figs. 5, 6, 8 and 9) fastened to the frame of the machine with provision for removal by means of screws 88. This bracket 87 is made with a pair of lugs 89 and 90 in which is journaled a rock shaft 91 which is capable of limited endwise movement as hereinafter described. Fastened to this rock shaft is a three-armed tension lever 92 made with lugs 93 rigidly secured to the rock shaft 91 in any desired manner, and to this lever 92 are pivotally connected two supplemental arms or levers 94 and 95, the former resting on a cam flange 96 on wheel 24, and the latter resting on a cam flange 97 on wheel 23. The middle depending arm 98 of the lever 92 carries an adjustable stop 99 adapted to engage the face of bracket 87 to limit the downward swing of lever 92. On the top of lever 92 rests a vertical slide rod 100 movable endwise in bearings on the bracket 87 and carrying at its upper end a yoke 101 which supports the needle cylinder through three pins 102 resting thereon. The arms 103 of lever 92 carries an adjustable stop screw 104 coöperating with the supplemental arm 95, while the arm 105 of lever 92 carries a similar adjustable stop screw 106 coöperating with the supplemental arm 94. The cam flange 97 (Fig. 17) is so shaped that during the first part of the knitting of the leg the pins 102 are stationarily supported by the arm 95 acting through lever 92 and rod 100 and then in order to tighten the stitch as the knitting runs into the ankle the cam flange 97 lowers the arm 95 and this movement of the arm 95 acts through lever 92, slide rod 100, yoke 101 and pins 102, to lower the needle cylinder and shorten the loop of the stitches as required. The degree of tightness at the ankle and foot of the stocking is determined by the adjustment of the stop 99. That is, the downward movement of the needle cylinder and therefore the tightening of the stitches is arrested when the stop 99 engages the bracket 87. During the knitting of the leg and foot a spring 107 bearing at one end against the lug 89 and at its other end against a pin 108 on rock shaft 91 serves to hold the latter and tension lever 92 at the limit of their movement toward wheel 23 with a finger 94$^a$ (Figs. 5 and 9) on supplemental arm 94 resting on the cam flange 96 near the outer edge of the latter. When, in knitting the leg, the beginning of the high splice is reached a cam 109 (Fig. 17) removably secured to the side of wheel 23 acts through a lever 110 and a lug 111 on lever 92 to shift tension lever 92 toward wheel 24 so as to bring the lug 94$^a$ into the path of a depression or recess 112 (Fig. 26) formed in the cam flange 96. At the same time the wheel 23 acts through lever 40 to shift the control to wheel 24 and the latter makes the two step movements referred to and shifts the control back to wheel 23. These two step movements serve as stated above and as hereinafter described, to first reduce the speed of the cylinder and then to change its movement from continuous rotary to reciprocating. These two steps of the wheel 24 are necessary to effect this change and the recess 112 is provided to prevent the cam flange 96 from affecting the position of the lever 92 as wheel 24 makes the second of these two steps. The rock shaft 91 and tension lever 92 are held at the extreme of their movement toward wheel 24 by the cam 109 during the knitting of the high splice and at the end of this operation cam 109 passes out of engagement with lever 110 and spring 107 shifts rock shaft 91 and tension lever 92 back toward wheel 23 again just as the machine starts upon the heel. It will be thus seen that during the knitting of the high splice the finger 94$^a$ occupies the recess 112 thus leaving tension lever 92 under control of cam flange 97 of wheel 23 during the knitting of the high splice.

As stated above, the knitting of the high splice, heel, foot and toe is, as herein shown, effected by a reciprocating motion of the cam cylinder and therefore at the start of the high splice and when the controller wheel 24 makes the two-step movements referred to above, a cam 113 (Fig. 28) on wheel 24 shifts a slide 114 mounted in ways on bracket 87, (Figs. 5 and 12) to the right toward wheel 23 and said slide acts through a shipper lever 115 to shift clutch member 7 out of engagement with clutch member 10

(Figs. 5, 8, 9, and 15) and into engagement with clutch member 9. The shipper lever 115 maintains this position until the completion of the toe, that is, throughout the knitting of the high splice, heel, foot and toe. The slide 114 (Fig. 11) carries a cam roll or stud 116 which coöperates with the cam 113 on wheel 24 and with another opposed cam 117 on said wheel, (Fig. 28). The cam 117 is for shifting slide 114 back again to its first position at the completion of both the heel and toe as described hereinafter. The slide 114 is made with an integral lug 118 for engaging shipper lever 115 when the slide is moved in one direction, and also carries a pawl 119 for shifting the shipper lever 115 in the opposite direction when the slide 114 is moved back, provided said pawl 119 occupies its operative position when the slide is moved back. The slide 114 also carries a supplemental slide 120 provided with an adjustable stud 121 which is held against the end of a slot 122 formed in slide 114, by a spring 123. The rear end of the stud 121, when it occupies an operative position coöperates with the beveled end 119$^a$ provided on one arm of the pawl 119. The flange 97 of control wheel 23 is made with a lateral extension 124 (Figs. 5, 17 and 18) to coöperate as an abutment with the supplemental slide 120, and this abutment 124 is so timed that during the knitting of the high splice $b$ and of the heel it is opposite the end of supplemental slide 120 and in the path of the latter. Now when, at the start of the high splice $b$, slide 114 is shifted toward wheel 23 (Fig. 5) by cam 113 (Fig. 28) to change onto reciprocating motion of the cam cylinder the abutment 124 on wheel 23 holds supplemental slide 120 against movement with slide 114. Consequently the beveled end 119$^a$ of pawl 119 forces its way under stud 121, lifting the opposite arm of pawl 119 out of coöperative relation with the shoulder 115$^a$ on shipper lever 115 with which said pawl coöperates. During the knitting of the high splice the machine is under the control of the wheel 23 and therefore the abutment 124 is made sufficiently long to oppose the supplemental slide 120 during the high splice and while the heel is being knitted under the control of wheel 24. At the completion of the heel, and while supplemental slide 120 is thus held by abutment 124, the cam 117 on wheel 24 (Fig. 28) shifts slide 114 back to its first position again and as slide 114 makes this movement, the spring 123 holds supplemental slide 120 against abutment 124 and the resulting relative movement between stud 121 and the beveled end 119$^a$ frees the pawl 119, and allows the latter to fall on to the top of shoulder 115$^a$. Thus while the knitting of the foot is effected under the control of the wheel 23, shipper lever 115 remains in position for reciprocating motion of cam cylinder 1. At the start of the foot the abutment 124 is carried away from the supplemental slide 120 so that when the control of the machine is shifted over on to wheel 24 at the start of the toe and slide 114 is shifted again toward wheel 23 by the cam 113, the supplemental slide 120 moves with it so that there is no relative movement between stud 121 and the beveled end 119$^a$, and consequently pawl 119 drops behind shoulder 115$^a$ where it remains until the toe is completed. At the completion of the toe the cam 117 (Fig. 28) shifts slide 114 back to its first position again and this time the pawl 119 carries the shipper lever 115 with it, reversing the clutch member 7 and changing the motion of cam cylinder 1 from reciprocating to continuous rotary. This is the complete action of the slide 114 on lever 115 for each stocking that is knitted with the machine adjusted as shown but there are certain other elements which are controlled and operated by said slide which relate to the yarn or thread feed devices and speed varying mechanism and which will be described later.

The driving belt for the machine, indicated by dotted lines in Fig. 5, is engaged by a yoke 125 provided on a slide 126 movably supported on the frame of the machine. To this slide 126 is connected one end of a spring 127 (Figs. 6, 13 and 14) said spring extending from the point where it is attached to the slide 126 around a pulley 128 and being fastened at 129 to the frame of the machine. The pulley 128 is loosely mounted on a stud 130 projecting from a second slide 131 which is mounted to move back and forth in ways 132 on the frame of the machine. The stud 130 is connected by a toggle lever 133 with another toggle lever 134 that is connected by a link 135 with the lower end of a hand lever 136 pivoted at 137 (Fig. 4) to the frame of the machine. The toggle lever 134 is mounted upon a stud 138 projecting from the frame of the machine. While the machine is knitting the leg of the stocking the toggle 133, 134 is straight or on a dead center, and serves to hold slide 131 against movement toward the right, Figs. 13 and 14, under the influence of spring 127, while the slide 126 is held by said spring at the limit of its movement toward the left, Figs. 13 and 14. With the parts in these positions the yoke 125 holds the driving belt on the high speed pulley 15 which is the position it occupies during the knitting of the leg as far as the beginning of the high splice. At the beginning of the high splice when the wheel 24 is moved two steps as above described, a cam 139 (Figs. 26 and 28) on wheel 24 swings a lever 140 to the right (Figs. 5 and 13) and the upper end of this lever engages the inner end of slide 126 and moves said slide outwardly against the pull of the spring 127, causing the yoke or fork 125 to shift the driving belt on to the slow speed pulley 22. This change of speed, as will be clear, is effected by the first of these two step movements of control wheel 24, and occurs, as above described, just before the high splice is started, and the slide 126 is held in this position with the belt on the slow speed pulley 22 from the beginning of the high splice to the completion of the toe, or in other words throughout the time that the cam cylinder is reciprocating and this duration of time extends from the beginning of the high splice to the completion of the toe as the machine is herein shown adjusted. The wheel 24 acts through lever 140 to hold slide 126 in this position during the high splice, heel and toe but not during the foot. Therefore, in order to hold said slide in this position during the knitting of the foot also I provide a latch 141 pivotally mounted on the bracket 87 and controlled by the shipper lever 115. Immediately after the operation of the lever 140 at the start of the high splice, the shipper lever 115 is thrown over, as above described, into position to change onto reciprocating motion of the cam cylinder, and this movement of the shipper lever swings a nose 142 on latch 141 into position behind the upper extremity of lever 140 (Fig. 9) and locks that lever in the position into which it was shifted by the cam 139. Since the shipper lever 115 does not go back to its first position again until the completion of the toe, that is, until the completion of reciprocating movements of the cam cylinder, the lever 140 will be locked in this position by the latch 141 throughout the knitting of the high splice, heel, foot and toe. At the completion of the toe, when shipper lever 115 is shifted back to its first position to change to continuous rotary motion, latch 141 falls from behind lever 140 and as the cam recess 143 in wheel 24 (Fig. 28) comes opposite the projection 144 of lever 140, spring 127 shifts said lever 140 and slide 126 back to their first positions again with the driving belt on the high speed pulley 15.

The hand lever 136 (Figs. 4 and 5) is provided with an adjustable screw or stud 145 coöperating with the cam-shaped end of a small cast-off lever 146 pivoted at 147 (Fig. 13) to the frame of the machine, and having an arm 148 to coöperate with a lever 149 (Fig. 8) carried by actuator 27. Normally the lever 149 is held out of the path of the arm 148 by a spring 150 (Fig. 5) but with an arm 151 on lever 149 in the path of a trip plate 152 (Fig. 13) occupying one of the pairs of slots on control wheel 23. The trip plate 152 is positioned so as to engage the arm 151 as the actuator 27 moves back after making its last feeding stroke at the completion of the stocking, and by this engagement swings lever 149 on its pivot so that its free end engages the arm 148 and operates lever 146, causing the outer end of the latter to push on the stud 145 and swing hand lever 136 in a direction to pull the middle of the toggle 133—134 off from dead center, whereupon spring 127 pulls slide 131 to the limit of its movement toward the right in Figs. 13 and 14, thereby carrying the driving belt from the high speed pulley 15 across the slow speed pulley 22 and on to a loose idle pulley 153, (Fig. 11) and stopping the machine. In order to provide for movement of the slide 126 independently of the slide 131 when it is actuated by lever 140 and returned by spring 127 as above described, the slide 126 is made with a slot 154 through which the stud 130 extends from the slide 131 while a slot 155 is provided in slide 126 through which the stud 138 extends from the frame of the machine.

A pivoted auxiliary locking latch 158 (see Fig. 10 in connection with Figs. 5, 6, 9, and 12) for the actuator 48 is controlled through a lever 161 by opposed cams 156 and 157 secured to cam lever 49 which is connected to, and vibrates in unison with, segment 17. The cam lever 49 is made with two opposed cams 159 and 160 to act on roll 50 of actuator 48, and for reasons which will appear presently, cam 159 is caused to operate actuator 48 at certain times during the knitting of a stocking and cam 160 at other times. Both the lever 161 and the auxiliary latch 158 are pivotally mounted upon a frame 162 hinged on a vertical axis at 163 to a bracket on the frame of the machine and pressed yieldingly toward wheel 24 by a spring 164. Frame 162 is provided with a laterally extending stud 165 which is held by spring 164 against the side of wheel 24 and in the path of three cams 166, 167 and 168 (Fig. 27). During the knitting of the heel and also during the knitting of the toe, these cams engage stud 165 successively in the order named and in coöperation with spring 164, swing frame 162 endwise to shift lever 161 back and forth from the path of one cam 156 or 157 to the other. The latch 158 coöperates with a lug 169 on the depending arm 48ª of actuator 48 and is yieldingly urged toward said lug by a spring 170. A lug 171 on frame 162 engaging a lug 172 on the supporting bracket for frame 162 limits the movement of frame 162 toward wheel 24.

The lever 40 of the control transferring devices is made with a rearwardly extending arm 173 (Fig. 12) with which a spring 174 coöperates to yieldingly hold lever 40 in either of its two positions.

The clutch-shifting lever 115 carries a stud 175 (Fig. 6) with which a spring 176 coöperates to yieldingly hold lever 115 in either of its two positions.

On the bracket 87 is fulcrumed a lever 177 (Fig. 9 in connection with Figs. 5 and 26) and said lever carries an adjustable pin or stud 178 coöperating with a cam 179 on wheel 24. The rear arm of said lever is pivotally connected with the lower end of a connecting rod 180, (Fig. 4). The stud 178 is adjustably mounted on lever 177 so that it can be shifted endwise into and out of coöperative relation with cam 179 to render the twister inoperative as hereinafter described, when it is not desired to reinforce the heel and toe.

The details of the thread-controlling devices of the machine do not need specific illustration herein, as the same form the subject matter of another application filed by me. Some of the parts illustrated in Fig. 4 will be briefly referred to, however. A bed 188 is carried by a bracket supported by two posts 190, 191, which are fastened to a bracket 192 of the main frame, and said bed supports a tension lever 225 which is actuated, through intermediate mechanism, by a vertically movable rod 231. The bobbin carrier 237 is encircled by a guide ring 242 secured to standard 192, and is rotated by a post 244 which rotates with the cam cylinder. Two bobbins $w^3$ $w^4$ rotate with the carrier 237. The yarn from bobbin $w^4$ passes up through a guide loop 248, thence down through a guide tube 249 and tension clamp 250 to a spring take up 251, from which it passes to the knitting devices. The yarn or thread from bobbin $w^3$ extends through a guide loop 248 and thence through a guide tube 252 and tension clamp 253 to a spring take up 254 from which it passes to the knitting devices.

The top plate 255 of the main frame is cut away as at 256 (Figs. 33 and 34), and over this opening 256 is secured the bed plate 3 by means of screws 257, said bed plate being in the form of a ring made with a central cylindrical portion $3^a$ provided at its lower end with an inturned flange $3^b$. A needle cylinder support 258 is provided at its lower end with two outwardly extending flanges 259 and 260 separated so as to provide an annular groove 261 between them, the bottom flange 259 resting upon and secured to the inturned flange $3^b$ of the bed plate by three screws $261^a$. At their peripheries the two flanges are made with vertical longitudinal grooves throughout their circumferences, each of which is of just sufficient width to receive one of an annular series or row of bars 262, and in making this needle cylinder support the bars 262 are first placed in these grooves of the flanges and then molten soft metal 264 such as lead or babbitt is poured into the annular groove 261 filling said groove flush to the outside of the bars 262 as shown in Fig. 36, thus rigidly securing the bars 262 to the needle cylinder support 258. The use of a metal 264 such as babbitt or lead makes it possible to pull out any one or more of the bars when, through breakage or otherwise, it is necessary to do so, and to drive another bar into position in its place, the new bar being securely fastened in place by the use of solder or the like. By having the annular body of babbitt or lead 264 between two annular flanges 259 and 260 as described, the temper of the bars 262 will not be drawn therefrom by the molten metal above the flange 260, but only for a slight distance above the annular body 264 leaving a substantial length, practically the whole length, of that portion of the bar engaged by the flange 260 with its original temper and strength. This is a feature of advantage over other skeleton cylinders where a body of metal like 264 is used to secure bars in place.

At their upper ends the bars 262 fit into radial grooves or slots $265^a$ provided on the under side of a ring 265 and said bars are surrounded by a supplemental ring 266 fastened by screws 267 to the main ring 265. The supplemental ring 266 is formed with an annular groove $267^a$ to receive within it an annular elastic and endless band 268 which engages notches 269 provided at the upper ends of the bars 262 and an annular groove 270 formed upon the outside of the depending and slotted skirt of the ring 265. By grasping the compound ring 265 266 an operator can readily and conveniently force it off from, or onto, the ends of the bars 262, the band 268 yielding as the ring is removed or placed in position. This can easily be done because when the ring 265, 266 is removed the bars 262 remain in their relative positions due to the cast metal mounting of their lower ends at 264, as described.

A needle cylinder 272 is provided upon its outside with longitudinal grooves $272^a$ to receive the needles of the machine, and this cylinder is mounted upon the needle cylinder support 258 so as to move vertically thereon, being held against rotation on said support by an arm 273 fastened at its lower end to the under side of flange 259 of the needle cylinder support 258 by screws 274 (Fig. 33.). The inturned flange $3^b$ on bed 3 is cut away as at 275 to accommodate the base of the arm 273. At its upper end the arm 273 extends outwardly from the interior of the needle cylinder support 258 through a hole 276 (Fig. 32) in the needle cylinder support 258 and into a longitudinal groove 277 (Fig. 32) formed upon the interior of the needle cylinder 272, said groove extending clear to the bottom of the needle cylinder so that the latter can be lifted clear of the internal cylinder 258 without interference from the arm 273. As shown in Fig. 34 the needle cylinder is made in two parts, the top or cap ring 271 being removably attached to the upper end of the body 272 of the cylinder. The top of the ring 271, or, in other words, the upper end of the needle cylinder, is formed with radial grooves 278 to receive sinkers 279, said sinkers being made each with a prong 280 extending under an annular shoulder 281 on cap ring 271 which serves to hold the sinkers against upward displacement relatively to the needle cylinder. Each sinker is made with a web-engaging hook 282 as usual. The sinkers 279 are supported in radial grooves 283 formed upon the upper side of a sinker ring 284 that is rigidly and immovably secured, by means of lugs 285 and plates 286, to an annular flange 287 on the outside of the needle cylinder, so that it is held stationary with the needle cylinder. The lugs 285 are on the sinker-ring 284 and extend underneath the annular flange 287, so that when the operator lifts the needle cylinder out of the machine by means of the ring 284, the lugs 285 which are amply able to do so, bear the strain of lifting the needle cylinder In most knitting machines as heretofore constructed, the parts corresponding to the lugs 285 have occupied just the reverse position with reference to the annular shoulder or rib 287, and have been so connected with the needle cylinder that they were usually displaced in removing the needle cylinder. An annular sinker cam-ring 288 coöperating with sinkers 279 is arranged on top of the sinker ring 284 and is held thereto with provision for relative rotary movement between the two rings by an annular retainer 289 secured to the under side of cam ring 288 by screws 290. The sinkers 279 are thin plates of metal and are each formed with a notch 291 which receives the cam 292 on ring 288 by which they are actuated.

The needle cylinder 272 is made with an exterior annular groove 293 and this groove receives an annular elastic endless band 294 which surrounds the needles and holds them in their grooves. The needle cylinder 272 rests upon and follows the vertical movements of the pins 102 as they are raised and lowered by a yoke 101.

Between the annular shoulder 281 and the top of the body 272 of the needle cylinder is provided an annular groove 295 for the prongs 280 of the sinkers, and in order to drain this annular groove 295 of lint and other material that may collect therein during use, I provide one or more parts or holes 296 extending through the ring 271 from the annular groove 295 through which such lint and the like is free to discharge. Also the outer periphery of the ring 271 is formed with longitudinal needle-receiving grooves 272$^b$ in alinement with the needle grooves on the exterior of needle cylinder body 272. At its upper end needle cylinder body 272 is formed upon its interior with a bayonet slot 297 to receive a stud 298 carried by the ring 271 through which the ring is secured to the needle cylinder body with provision for removal.

The cam cylinder 1, carries the needle-operating devices and during the operation of the machine these devices are automatically controlled from the two wheels 23 and 24 through a controller cam ring 299 rotatably secured to the lower end of the cylindrical middle portion 3$^a$ of the bed plate 3 by means of screws 300. That is, the controller ring 299 is secured to the bed plate 3 by the screws 300 so that it can be rotated relatively to the bed plate 3. From the under side of controller ring 299 project two studs 301 (Fig. 34) between which extends a stud 302 projecting from an arm 303 (Figs. 5, 6 and 8) forming part of a rocker 304 loosely mounted on a fixed rocker supporting bar 305$^a$. Rocker 304 is also made with an arm 305 connected by a link 306 with one arm of lever 307 (Fig. 9) fulcrumed on the frame of the machine, whose other arm carries a stud or roll 308 coöperating with a cam 309 on wheel 24 (Fig. 26). The arm 303 is moved intermittently and step by step as the knitting progresses by the cam 309 coöperating with a spring 310 connected to arm 303, and during the knitting of the stocking the controller ring 299 occupies one or the other of the four positions indicated by dotted line positions of arm 303 in Fig. 52. At its rear end the rocker is made with an upwardly extending arm 311 whose upper end is formed as a cam (Fig. 7) and supports a plunger rod 312 (Fig. 8) mounted to move vertically in bearings on the frame of the machine, the upper end of said rod engaging and supporting a cam lever 313 which controls the yarn-changing mechanism, as described later. To the arm 311 are fastened two cams 314 and 315 to coöperate with the lower end of rod 312. The arm 311 also carries a stud 316 for engaging and operating a lever 317 (Figs. 6 and 8) fulcrumed at 318$^a$ and pivotally connected to the lower end of the rod 231. The purpose of the lever 317 connected as described with tension lever 225 is, as will appear later, to provide greater tension and take up effect on the supply thread during the knitting of the heel, foot and toe than during the knitting of the leg of the stocking.

On the top side of the bed plate 3 are provided bolster bosses 317$^a$ (Fig. 33) which support a ring 318 (Fig. 34) that overlaps the gear 2 and thereby holds said gear and the cam ring against upward displacement, the retaining ring 318 being fastened by screws 319 to the bed plate 3. To the top side of retaining ring 318 are secured three cam boxes 320, 321 and 322 (Figs. 32 and 41 to 46) each comprising a pair of opposed cams which are alternately thrown into operative position as described later.

Cam box 320 (Figs. 41 and 42) comprises two arms 323 and 324 pivoted on a stud 325, the arm 323 being made with a cam 326 and the arm 324 with a cam 327. The arm 324 is formed with a slot 328 into which a pin 329 on a lever 330 extends. This lever 330 is pivoted at 331 to box 320 and carries another pin 332 at its opposite end which extends into a slot 333 formed in arm 323. A spring 334 acting through pin 332 serves to swing arm 323 down while a lever 335 pivoted to box 320 moves arm 323 in the opposite direction. The lever 330 which carries the pin 332 serves to swing the arm 324 up when arm 323 is swung down and to swing arm 324 down when arm 323 is swung up. The lever 335 is made with a depending arm 336 which extends through a hole 337 in retaining ring 318 and rests upon the arm 338, (Figs. 33 and 52) of a lever 339 pivotally connected at 340 to a lug 341 on the under side of bed plate 3. The lever 339 is made with a stud 342 that rests on the controller cam-ring 299.

The cam box 321 shown in plan and elevation in Figs. 43 and 44 comprises two arms 343 and 344 pivoted at 345 to said box, and an arm-connecting lever 346 pivotally connected with the box and acted upon by a spring 347. The arms 343 and 344, lever 346, and the spring 347 are made like the corresponding parts of the cam box 320 and have the same mode of operation except that the pivot 348 of the lever 346 is a stud integral with the latter and carries an arm 349 coöperating with the upper end of a pin 350 mounted in the retaining ring 318 and resting at its lower end on an arm 351. The arm 351 is on a rock shaft 352 journaled in a bearing on the under side of bed plate 3, said rock shaft being made with another arm 353 (Fig. 33) resting on the controller cam ring 299.

The cam box 322 (Figs. 45 and 46) comprises two arms 354 and 355 pivoted at 356 to the box 322 and connected by a lever 357 pivotally mounted at 358 on the box 322. A lever 359 is pivotally mounted on the box 322 and is made with an upwardly extending pin coöperating with the arm 355, said lever resting upon a pin 360 (Figs. 33 and 52) mounted to move vertically in the retaining ring 318 and resting at its lower end upon an arm 361 projecting from a rock shaft 362 journaled in a bearing on the under side of bed plate 3. This rock shaft is made with a second arm 363 resting on the controller cam ring 299. Within the cam box 322 is a spring 364 engaging a pin 365 on the lever 357. The arms 354 and 355, lever 357 and spring 364 are constructed the same and have the same mode of operation as the corresponding parts of the cam boxes 320 and 321, except that while the springs 334 and 347 serve to normally hold the innermost arms 323 and 343 in their lowered or retracted position, the spring 364 normally holds the innermost arm 354 of cam box 322 elevated and in its operative position.

During the knitting of the leg of the stocking the controller wheel 24 is stationary and the stud 308 on the lever 307 occupies the position on the cam 309 shown in Fig. 9, and it remains at this point until the top of the high splice is reached. Then the controller wheel 23 shifts the control over to the wheel 24 momentarily so that the latter makes two step movements and shifts the control back onto wheel 23 again. The first of these two step movements of wheel 24 does not disturb lever 307, but the second of these two step movements causes stud 308 to ascend the first rise of cam 309 where it remains during the knitting of the high splice. The movement thus imparted to lever 307 acts through link 306, arm 305, rocker 304 and arm 303 to move controller ring 299 one step in the direction of the arrow, (Fig. 52) which results in the raising of lever 339 (Figs. 33 and 32) without disturbing the condition of the other elements controlled by ring 299. This movement of lever 339 acts through lever 335 (Figs. 42 and 52) to reverse the arms 324 and 323, throwing the latter up into operative position and the former down out of operative position. The knitting needles (see Fig. 32) are divided into two semicircular groups comprising a series of short butt needles 366 and a series of long butt needles 367, the former being at the back of the cylinder and the latter at the front, with two medium butt needles 368 and 369 interposed between the adjacent ends of the two series or groups. In knitting the high splice of the stocking the short butt needles 366 knit only the high splice b, while the long butt needles knit only the front portion b' opposite the high splice, the medium butt needles being at this time common to both series of needles and serving to interconnect the two simultaneously knitted fabrics that are produced at the ankle. Therefore, the purpose of reversing the cams 326 and 327 at the start of the high splice is to adjust two switch cams 403 and 381 (Fig. 32ª) hereinafter described, on cam cylinder 1 so that one of the two sets of knitting cams provided on said cylinder will act upon only the long and medium butt needles while the other set of knitting cams will act only upon the short and medium butt needles. At the completion of the high splice the wheel 23 shifts the control over on to the wheel 24 which immediately starts upon the completion of its revolution begun by the two steps imparted to it at the beginning of the high splice. The first step movement of wheel 24 at this time causes the second rise on cam 309 (Fig. 9) to act through lever 307, link 306, arm 305 and rocker 304 to shift controller ring 299 a second step in the direction of the arrow (Fig. 52), thereby operating both rock shafts 352 and 362 which raise the pins 350 and 360 and reverse the condition of the two cam boxes 321 and 322. This causes the cams of box 321 to adjust the three lowering cams, 398, 399 and 453 of cylinder 1, hereinafter described, and the box 322 to operate the yarn changing devices and another switch cam 403, hereinafter described, for the knitting of the heel. The lever 339 which is operated by the first step movement of the controller ring 299 carries a cam 370 extending up through a hole 371 (Fig. 33) in the bed plate 3 into a position to coöperate with two pins 372 and 373 through which said cam 370 controls the "lifters" or narrowing pickers of cam cylinder 1. To the under side of bed plate 3 is pivoted at 374 a lever 375 carrying a cam 376 extending upwardly through a hole 377 formed in the bed plate, said lever resting upon the controller ring 299. The cam 276 coöperates with two vertically movable pins or plungers 378 and 379 (Fig. 52) mounted in the gear 2, through which cam 376 controls the "droppers" of cylinder 1. The cams 326 and 327 of box 320 coöperate with a downwardly extending lug 374$^a$ (Figs. 31, 32 and 32$^a$) provided on one arm in a bell crank lever 375$^a$ fulcrumed upon a bracket 376$^a$ fastened by screws to the outside of the cam cylinder 1. The other arm of bell crank 375$^a$ is made with a stud 377$^a$ coöperating with the beveled end 378$^a$ of a switch cam lever 379$^a$ which is pivoted at 380 to the bracket 376$^a$. Bell crank 375$^a$, acting on the beveled end 378$^a$, swings switch cam lever 379$^a$ in one direction, while a spring 381$^a$ swings said lever 379$^a$ in the opposite direction. The end 381 of lever 379$^a$ is shaped as a cam (Fig. 51) so that when it is swung inwardly into the path of the needle butts by bell crank 375$^a$ and said cam is traveling in the direction of the arrow $y$ (Fig. 32) it will deflect the butts of the long butt needles 367 upwardly but will pass the short and medium butts without engaging the latter. This cam 381 is arranged at one side of one of the two sets of knitting cams of cam cylinder 1, and this set, indicated at 382, is hereinafter referred to as the short butt knitting cams, the other set of knitting cams shown at 383 being hereinafter called the long butt knitting cams. At each side of the short butt knitting cams 382 is arranged a "lifter" or narrowing picker 384 and a fixed cam plate 385 both mounted on cylinder 1. The cam plate 385 at the side of the knitting cams 382 opposite cam 381 carries a trailer switch cam 386 which is free to swing up and down and sidewise on a stud 387, said trailer cam being yieldingly urged inward and held depressed by a spring 389 (see Figs. 32 and 51). This cam is so constructed that when in operative position it engages only the long butt needles. During continuous rotary movement of the cam cylinder, that is while the cam cylinder is traveling continuously in the direction of the arrow $y$, (Figs. 32 and 51) the lower end of the trailer cam 386 trails idly as shown in Fig. 51.

Between the two stitch cams 382$^a$ and 382$^b$ of the short butt knitting cams 382, (Fig. 51) the cam cylinder 1 is made with a vertical slot 390 (Fig. 47) in which is mounted a two-part slide 391 carrying a switch cam 392 made with an integral stud 393 journaled in the slide 391. At its outer end the stud 393 carries and has connected with it a spring 394 which yieldingly holds switch cam 392 in the position shown in Fig. 51. Pivotally mounted at 395 on the slide 391 is a spring-pressed latch 396 coöperating with a stud 397 on the cam cylinder. This switch cam 392 is constructed and operates as usual.

At 398 and 399 are two opposed lowering cams, one arranged adjacent to lifting cam 381 and the other adjacent to trailer cam 386. During reciprocating knitting the two cams 381, 386, occupy operative positions and therefore as the knitting cams 382 approach the long butt needles, the latter are thrown upwardly by one or the other of the cams 381 or 386 so as to pass idly over cams 385 and 400, and over switch cam 392, and over cam 401, and then are thrown down again onto the knitting plane by one or the other of the lowering cams 398 or 399. When the cam cylinder is moving in the direction indicated by the arrow $y$ (Fig. 51) the switch cam 381 throws the long butt needles up onto the fixed cam plate 385 and the latter deflects these long butt needles upwardly over the usual guide cams 400—401 to the lowering cam 399. When the cam cylinder is moving in the direction opposite, then the trailer cam 386 lifts the long butt needles up onto its cam plate 385 from which they pass over the guide cams 401—400 to the lowering cam 398. It will thus be seen that while knitting by a reciprocating motion of the cam cylinder the long butt needles are excluded from the knitting cams 382 by cams 381 and 386.

Above the knitting cams 383 is a pair of opposed "droppers" or widening pickers 402 between which is arranged another switch cam 403 which is movable radially toward and from the axis on which the cylinder turns and also vertically, and this switch cam is automatically controlled so that during reciprocating knitting at the high splice and foot, it is held retracted and occupies a position beyond the reach of the short butt needles (Fig. 39) so that only the long butt and two medium butt needles will be engaged by this switch cam and be caused to knit by cams 383. Also during the knitting of the heel and toe this switch cam 403 occupies a wholly inoperative position so that all of the needles are excluded from knitting cams 383. It will thus be seen that during reciprocating knitting the excluded needles will jump the gap in front of switch cam 403 and pass the knitting cams 383 without knitting. During the continuous rotary motion of the cam cylinder and while it is knitting the part of the leg of the stocking above the high splice, the switch cam 403 occupies a position nearer the axis of the cam cylinder (Figs. 37 and 38) so that said switch cam 403 will engage all of the needle butts, medium, short and long, and cause them all to coöperate with the knitting cams 383. While the heel and toe are being knitted, switch cam 403 occupies the position shown in Fig. 40, that is, it is at the limit of its upward and outward movements so that the knitting cams 383 are wholly inoperative while the heel and toe are being knitted. The switch cam 403 is made with a stem 404 movably mounted in a slide 405 which in turn is movably mounted in a vertical slot 406 provided in cam cylinder 1. A pin 407 prevents cam 403 from turning on the axis of stem 404, and the outer end of said stem is made with a vertical slot into which projects a vertical blade 408 provided on the inner end of a slide 409 mounted to move radially on a bracket 410 secured to the cam cylinder. The slide 409 has pivoted to it at 411 a lever 412 made with projections 413 and 414 coöperating with a slide operating lever 415 fulcrumed at 416 on the bracket 410. Besides coöperating with the lever 412 the lever 415 also coöperates with a cam slide 417 mounted to move radially on the bracket 410. At its inner end, slide 417 is made with a cam surface 418 (Figs. 38 and 39) coöperating with the upper end of slide 405. When lever 415 is operated to withdraw slide 417 from above slide 405, a spring 419 raises slide 405 into position against the top of slot 406, and when cam slide 417 is moved inwardly by lever 415, slide 405 is depressed thereby. The lever 412 is made with a depending arm 420 to coöperate with the cams of cam box 320 in Fig. 32. The slide 409 and its lever 412 constitute means through which switch cam 403 is moved radially by the cams of cam box 320, so that it occupies its innermost operative position during the knitting of the leg of the stocking, and its outermost operative position during the high splice and split foot. The lever 415, slide 417, and spring 419 serve as means through which the cam box 322 raises and lowers switch cam 403 to shift the latter into and out of its wholly inoperative position. The lever 415 carries an adjustable stud 421 (Figs. 37 and 37ᵃ) coöperating with the cams of cam box 322 and this lever 415 not only operates the cam slide 417, but, through the projections 413 and 414, it controls the lever 412 so as to hold the arm 420 thereof in an inoperative position relatively to the cams of cam box 320, during knitting of the heel and toe and so as to shift said arm back into operative position at the completion of the heel and toe. The slide 409 is yieldingly held in either of its two positions by a spring 422 secured to the cap plate of the bracket 410.

The lowering cam 398 is fixed to a spindle 423 mounted in the bracket 376ᵃ so as to be free to rock or move endwise to a limited extent. At its outer end spindle 423 is made with an annular groove into which projects a stud 427 provided at the free end of an arm 428 pivoted at 429 to the bracket 376ᵃ. The free end of the arm 428 is provided on its under side with a stud 428ᵃ to coöperate with the cams of cam box 321, the cam 430 engaging said stud to shift the lowering cam 398 outwardly and the cam 431 of said box engaging said stud to shift lowering cam 398 inwardly. Lowering cam 399 is mounted upon the inner end of a spindle 432 formed at its outer end with an annular groove into which projects a stud 433 on an arm 434 pivoted at 435 to a bracket 436 fastened to cam cylinder 1. This arm 434 is provided on the under side of its free end with a stud 436ᶠ to coöperate with the cams 430 and 431 of cam box 320.

The bracket 436 (Fig. 32) in which the stem 432 of lowering cam 399 is mounted is secured to the outside of cam cylinder 1, within a shallow vertical groove 436ᵃ on the exterior of said cylinder, (Fig. 32ᶜ), by a screw 436ᵇ and is made with an integral outwardly projecting arm on which the lever arm 434 is pivotally mounted. The stem 432 of cam 399 extends radially through bracket 436 and the latter is cut away to permit a spring 436ᶜ to rest upon said stem. This spring 436ᶜ is fastened at one end to the bracket 436 and bears near its middle upon the stem of the cam while its free end engages a pin 436ᵉ projecting from cam 399 and yieldingly holds the latter elevated with pin 436ᵉ against a stop projection on the bracket. The middle portion of spring 436ᶜ coöperates with two annular grooves 436ʰ (Fig. 32ᵇ) to yieldingly hold the stem in either of the two positions into which it is shifted by cam box 320.

The lifters 384 are counterparts and one of them is shown in plan view in Fig. 49. Each is a segmental block mounted in curved ways on the cam cylinder and made with a projecting rib 437, coöperating with a latch 438 connected with the cam cylinder as at 439 so that it is free to slide vertically on the cylinder to drop into the path of the rib 437 or withdraw from said path. A spring 440 bearing at one end against the lifter and at its other end against a pin 441 secured to the cam cylinder, acts with a tendency to throw the lifter inward into operative position. When the cam 370 (Fig. 33) occupies its operative position during the narrowing operation at the heel and toe, then, as the pins 372 and 373 in gear 2 pass over said cam they are lifted and act to push the latches 438 upward out of the paths of their shoulders 437, whereupon springs 440 throw the lifters inward and downward into operative positions. As each lifter picks up a needle and is pushed outwardly thereby it is caught and held by its latch 438 until its pin 372 or 373 again passes the cam 370. The lifters are held in their ways by the cam plates 385 which are fastened, as shown in Figs. 48 and 49, to the cam cylinder by means of screws 442.

The droppers 402 are segments like the lifters and are likewise mounted in curved ways (see Fig. 50) on the cam cylinder but are adapted to engage two needles at one time. Each dropper is made with a rib 443, like the ribs 437 of the lifters, which coöperates with a latch 444, similar to the latches 438 of the lifters, said latches 444 being arranged to coöperate with the pins 378 and 379 in gear 2 in the same way that the pins 372 and 373 coöperate with the latches 438. Also the latches 444 are mounted on the cam cylinder to move vertically in the same fashion as are the latches 438. Each dropper has arranged within it a spring 445 bearing at one end against the dropper and at its other end against a pin 446 on the cam cylinder 1. When each latch 444 is lifted out of the path of its rib 443 by its pin 378 or 379 the spring 445 throws the dropper inward and upward into position to engage the needle butts and as it engages two needle butts and pulls them down it is forced outwardly clear of the needle butts and caught and held in its retracted position by its latch 444.

447, 448, 449 and 450 (Figs. 32 and 51) are guards carried by the cam cylinder to prevent upward displacement of the needle butts. The guards 449 and 450 are extensions of the cap plates 451 which are fastened by screws 452 to the cam cylinder 1, and hold the droppers in their ways.

The lowering cams 398 and 399 act only upon the long and medium butt needles, because the short butt needles are never thrown up out of action while said cams are in operative positions. A third lowering cam 453 is provided for throwing down all needles used in knitting the heel or toe that may be up at the completion of either of those operations. Cam 453 is fixed to the inner end of a spindle 454 mounted to rotate and move endwise to a limited extent in a bracket 455 fixed to said cylinder 1. At its outer end spindle 454 is made with an annular groove into which projects a stud 456 on the free end of an arm 457 pivoted at 458 to the bracket 455. On the under side of the free end of arm 457 is a stud like the stud 436$^t$ of arm 434 (Fig. 31) to coöperate with the cams 430 and 431 of cam box 321. The brackets 376$^a$ and 455 are removably secured to the exterior of cylinder 1, like bracket 436, the bracket 376$^a$ having the cam 398, cam 381, levers 375 and 428, and guard 447 mounted on it, and the bracket 455 having the cam 453 and lever 457 mounted on it. Also springs 436$^c$ are provided on brackets 376$^a$ and 455 coöperating with the spindles of cams 398 and 453 to yieldingly hold said cams elevated and in their retracted or projected positions. By mounting the parts referred to upon the brackets as described not only can said parts be conveniently and properly assembled, but any one of the cylinder brackets with the parts carried thereby can be quickly removed from the cylinder for adjustment or repair and quickly and conveniently replaced.

The three cam boxes 320, 321 and 322 are made of different heights, (Fig. 31), the highest, box 322, being farther from cylinder 1 than the other two (Fig. 32), the lowest, box 321, being nearest cylinder 1, and the box 320 which is of an intermediate height, occupying an intermediate position relatively to the cylinder. The levers on cylinder 1 with which the boxes coöperate are mounted on cylinder 1 each at a height and distance from the axis of the cylinder to correspond with the position and height of its cam box, and consequently there is no interference of the levers and cam boxes.

Bracket 245 fixed to cam cylinder 1 has mounted on it an endwise movable stem 459 carrying at its inner end an elevating cam 460 (Figs. 32 and 51) which is normally held in an inoperative position by a split ring 461$^a$ engaging an annular groove on stem 459, said ring being arranged in a slot provided in the bracket 245. When it is desired to remove the needle cylinder from the machine, the operator forces stem 459 inwardly, bringing cam 460 into position to throw all of the needles up on to the upper plane when the cylinder is rotated by hand.

The cam cylinder 1 is made with two upwardly extending posts 461 and 462 (Figs. 4 and 32) and to the latter an arm 463 on a latch ring 464 is pivoted at 465. Another arm 466 at the opposite side of latch ring 464 (Figs. 55 to 59) carries a pivoted spring-pressed latch 467 which normally is in locking engagement with a shoulder 467ª (Fig. 4) on post 461 so that latch ring 464 is rigidly connected with the posts of the cam cylinder with which it rotates. On the outside of post 461 is mounted a vertically movable slide 468, (see Fig. 31 also) which carries a stud 469 coöperating with the cam arm 313 (Figs. 4, 8 and 32). The cam arm 313 is elevated and lowered during the operation of the machine by the cam lever 311 and when shifted from its upper to its lower position, the stud 469 rotating with the cam cylinder 1 rides up and over the free cam-shaped end of lever 313 and slide 468 is shifted upward on post 461 where it is caught and held by a spring detent 470 engaging the lower end of slide 468. When cam arm 313 is shifted from its lower to its upper position the stud 469 rotating with the cam cylinder 1 rides under the free cam-shaped end of arm 313 and slide 468 is shifted downward on post 461 where it is caught and held by detent 470 engaging a notch, 471 on the side of slide 468. Slide 468 is made with a fork 472 engaging one arm of a bell-crank 473 pivotally mounted on post 461. The other arm of bell crank 473 engages a slide 474 mounted upon two studs 475 projecting from arm 466 of latch ring 464. Slide 474 carries a pin 476 extending into a slot provided in one arm of a bell crank lever 477 pivotally mounted on the top of arm 466 of latch ring 464. The other arm of bell crank 477 is connected by two links 478 and 479 with two thread guide actuating rockers 480 and 481 which are pivotally mounted upon two upright studs 482 and 483 carried by latch ring 464 (Figs. 31 and 31ª). The hubs of these rockers 480 and 481 are interlocked with the hubs of thread guides 484 and 485 so that there is a limited amount of lost motion between the lug 486 on each rocker and the sides of the coöperating notch 487 on the hub of each thread guide. The purpose of this lost motion will appear hereinafter. The thread guides 484 and 485 are loosely mounted upon studs 482 and 483 and are swung on said studs by the rockers 480 and 481 into and out of operative position, thread guide 484 being shown in Fig. 55 as occupying its inoperative position and thread guide 485 its operative position. The inward movement of each thread guide is limited by a depending stud 488 (Fig. 31) on the thread guide engaging latch ring 464, while each thread guide is made with an arm 489 coöperating with the latch ring to limit the outward movement thereof. In the drawings, slide 468 occupies its uppermost position with thread guide 485 operative and thread guide 484 inoperative. When slide 468 is depressed by cam arm 313, at the start of the high splice, it acts through bell crank 473, slide 474, lever 477, links 478 and 479 and rockers 480 and 481 to swing thread guide 484 outward into operative position and thread guide 485 inward into inoperative position. When slide 468 is elevated by cam arm 313 at the completion of the toe, it acts through the same parts to return the thread guides to their first position again. A spring 475ª mounted on studs 475 engages one arm of bell crank 477 and yieldingly holds said bell crank in either of its two positions. By reason of the lost motion between rockers 480 and 481 and their thread guides, and the action of two springs 491 connecting the hubs of the thread guides with the hubs of their rockers, Fig. 31ª, the innermost inoperative thread guide will be swung outwardly into operative position before the rocker of the other operative thread guide acts to throw it out of operative position so that momentarily, while the thread guides are being reversed, both of said guides are in action. In other words when slide 468 is shifted in either direction, the inoperative thread guide is thrown into operative position before the operative thread guide is thrown out, thereby preventing any stitches being dropped during the operation of changing.

The thread guides 484 and 485 are made with guide tubes 492 and 493 which deliver the thread to a throat plate 494 (Figs. 55, 58 and 59) which in turn delivers the thread to the needles just in advance of the operative side of the short butt knitting cams 382 (Fig. 51). To receive throat plate 494 and to provide for the passage back and forth of guide tubes 492 and 493 and their threads, the latch ring 464 is made with a gateway 495. Each thread guide comprises two adjustable gates 496 and 497 (see also Fig. 31) at opposite sides of its guide tube so arranged that gate 496 of thread guide 485 coöperates with gate 497 of thread guide 484 to close the gateway 495 to the latches of the needles when the thread guide 485 is in action, and so that when thread guide 484 is in action its gate 496 coöperates with gate 497 of thread guide 485 to close gateway 495 to the latches of the needles. Thus whichever thread guide occupies operative position the gateway 495 is maintained closed to the latches of the needles and said latches can not be thrown up by centrifugal force and closed or broken. Above the latch ring 464 and at their outer sides the gates are beveled or inclined as at 498 so that should for any reason a latch become displaced and approach the gates resting on the top of the latch ring, then the bevels 498 will deflect such latch upward and close it without injury.

In order to guide the fabric down through the needle cylinder and to prevent its bulging upward while the heel and toe are being knitted, which, if permitted, would interfere with the thread feed, I provide a presser plate 497ª (Figs. 34 and 55) supported from the latch ring 464 by hangers 498ª, said plate being formed adjacent thread guides 484 and 485, with a pair of opposed thread catching hooks 499, between which the idle thread is confined so that when the thread guide of this idle thread is thrown into operative position the thread controlled thereby will be in proper position to pass through the gateway 495 and properly connect with the needles. Two spring clips 500 and 501 are provided on the presser plate 497ª for use in holding the threads in opposition to the spring take-ups 225, 251 and 254 while removing the work from the machine.

Latch ring 464 is provided with a second throat plate 502 diametrically opposite throat plate 494 and on the adjacent arm 463 of the latch ring is provided a thread-guiding eye 503 through which the thread passes from spring takeup 251 to and through the throat plate 502 to the work.

During continuous rotary motion of the cam cylinder, both sets of knitting cams 382 and 383 (Fig. 51) are knitting the former with thread delivered by the guide 485 through throat plate 494, and the latter with thread delivered by guide 503 through throat plate 502. In changing over on to reciprocating motion at the beginning of the high splice, the lifters are thrown into action while the thread guide 484 is thrown into operative position and the thread guide 485 out of operative position. During the knitting of the high splice the knitting cams 382 are knitting with thread delivered by guide 484 through throat plate 494 to produce the high splice, while the knitting cams 383 are knitting with thread delivered by guide 503 through throat plate 502 to form the front of the ankle-part of the stocking. At the completion of the high splice and beginning of the heel the knitting cams 383 are thrown out of action, as will be described later, and the narrowing and widening devices act in succession while the heel is knitted with thread delivered by thread guide 484 which continues in operative position from the high splice. At the completion of the heel, the droppers are thrown out; knitting cams 383 are thrown into action again, and while the cams 382 knit the bottom of the foot with thread delivered by guide 484, which is continued in action from the heel, the cams 383 knit the instep or top of the foot with thread delivered by guide 503. At the completion of the foot, knitting cams 383 are again rendered inoperative and the narrowing and widening devices act successively while the toe is knitted with thread delivered by the guide 484, which continues in action from the foot. During the knitting of the heel and toe, the stretch of the thread delivered by guide 503 which extends from throat plate 502 to the work is, during the reciprocating movements of the cylinder, alternately wrapped and unwrapped idly around the needles, first in one direction and then in the other. The machine herein shown is arranged and constructed so that at the completion of the toe when the motion of the cam cylinder is changed on to continuous rotary, the thread guide 484 continues in action for one course and then is thrown out of action while the thread guide 485 is thrown into action. Then the machine knits a few, say five or six, courses to finish up the stocking. In order to facilitate subsequent operation of closing the toe of the stocking, the first course knit after the completion of the toe is made a slack course for two reasons, first to distinguish it from the courses of the toe, and subsequent courses, so that it serves as a marker, and so as to provide a course of slack loops which can be easily transferred as is usually required in the operation of finishing the toe. In order that the machine herein shown will act automatically to make this first course after the toe a slack course, the wheel 23 is provided with a cam 504ª (Fig. 17) and wheel 24 is made with a short slight rise 504 (Fig. 26ª) timed so as to engage arm 94 as this course of stitches is started, and through lever 92, rod 100, yoke 101 and pins 102 raise the needle cylinder to increase the length of the loops, but only during this marker course.

The sinker cam ring 288 is made with a pair of lugs 505, 506, (Fig. 53) embracing the post 462 of the cam cylinder 1, said lugs being provided with adjustable screws 507 and nuts 508 as usual. The screws 507 serve to connect the sinker cam ring 288 with the cam cylinder 1 so as to provide for limited relative rotary movement between the two for the reasons well known to those skilled in the art. The cam 292 of sinker cam ring 288 comprises four adjustable sections 292ª, 292ᵇ, 292ᶜ, and 292ᵈ (see also Fig. 54). The sections 292ᵇ and 292ᶜ which shift the sinkers 279 radially to coöperate with knitting cams 383 are pivotally fastened together and to a plate 509 by a pin 510. The plate 509 is adjustably secured to the top of sinker cam ring 288 by two screws 511 which extend through slots 512 in the plate 509, so that said plate can be adjusted bodily in a radial direction or either end thereof can be swung radially on the screw 511 at the opposite end as a pivot. The adjacent ends of the sections 292ᵇ and 292ᶜ are overlapped and formed with slots 513 which permit of said sections being moved angularly about the axis of ring 288 relatively to pin 510 and plate 509. These two sections of cam 292 are clamped to plate 509 by screws 514 which extend through slots 515 formed in plate 509, said slots being arranged to permit of the two sections being adjusted angularly around the axis of ring 288. One end of the section 292$^a$ is pivoted at 516 to the end of section 292$^b$, while one end of the section 292$^d$ is pivoted to the end of section 292$^c$ at 517. The opposite ends of the sections 292$^a$ and 292$^d$ carry screws 518 which extend through slots 519 in cam ring 288 and support said ends with provision for adjustment about the axis of ring 288.

At 292$^e$ is shown the section of cam 292 which coöperates with the knitting cams 382 and this section is permanently fixed to the sinker cam ring 288 in proper position with relation to knitting cams 382 by screws 519.

By means of the adjustable sections 292$^a$, 292$^b$, 292$^c$ and 292$^d$ and their supporting plate 509 the two sections 292$^b$ and 292$^c$ may be adjusted universally, toward and from the axis of sinker cam ring 288, and around said axis independently of section 292$^e$, as may be required to accurately time said cam sections with reference to the knitting cams 383. That is, by adjusting screws 507 the section 292$^e$ may be properly positioned relatively to cams 382 and then by adjusting sections 292$^b$ and 292$^c$ the latter may be independently adjusted to position them properly with relation to cams 383. This independent adjustment of the two parts of the sinker cam ring is very desirable and is wholly new with me.

As described above, the cam 109 holds the lever 92 with the arm 94$^a$ resting in the depression 112 during the knitting of the high splice and then as the high splice is completed the wheel 23 shifts the control over to wheel 24, the cam 109 passes away from lever 110 allowing lever 92 to be shifted by spring 107 toward wheel 23 with arm 94$^a$ out of the path of rise 504 where it remains until the start of the toe. At the completion of the foot the cam 56$^b$ acting through levers 110 and 92 shifts arm 94$^a$ back into the path of rise 504 so that at the completion of the toe said rise will operate to produce the single slack marker course.

At the start of the high splice, or in other words, at the start of the reciprocating motion of cam cylinder 1, the cam 309 acts through lever 307 and connections above described, to shift controller ring 299 one step so as to cause it to reverse the cam box 320 and throw the lifters into action for the knitting of the high splice, while the simultaneous movement of cam 311 at this time raises plunger 312 and cam 313 so that thread guides 484 and 485 are reversed and at the same time the cam 314 on arm 311 slides rocker 304 on rod 304$^a$ toward the right (Fig. 8) against a spring-pressed plunger 520, so as to bring plate 315 under plunger 312. The plate 315 throughout its upper edge is concentric with the axis of the rocker 304 so that so long as said plate 315 is under plunger 312 the swinging movements of rocker 304 will not affect plunger 312.

In knitting the stocking of Fig. 1, the cam 311 is not returned to its normal or first position again by cam 309 until the toe has been completed and with certain classes of goods it is desirable to knit the single slack marker course of the few finishing courses $e'$ with the same thread used to knit the heel and toe which may or may not be of a different color from that used in the rest of the stocking. For this reason I provide a detent 521 (Figs. 5, 6, and 8) in the form of a bell crank lever pivoted on bracket 87, one arm of which coöperates with rocker 304 and a stud 524 on hub 7, and the other arm with a projection or finger 522 rigidly secured to lever 92. When rocker 304 is shifted to the right (Fig. 8) as above described, at the start of the high splice, said rocker is moved out of the path of the upright arm of detent 521 and the latter under the influence of a spring 523 is swung into position behind the end of the rocker 304. At the completion of the toe the cam 309 permits the spring 310 to swing rocker 304 and its two arms 303 and 311 back into line with their first positions again which withdraws cam 314 from engagement with the plunger 312 and restores ring 299 to its first position. At this time, however, the detent 521 is in the path of the inner end of rocker 304 and prevents spring-pressed plunger 520 from returning rocker 304 to its normal position until after the single slack course referred to has been knitted. Upon the completion of this single slack course stud 524 on hub 7 acts on lug 525 of detent 521 to remove the latter from in front of the end of rocker 304 and plunger 520 slides the latter to the left (Fig. 8) back to its first position again. This return movement of rocker 304 causes plunger 312 to drop off from plate 315, thereby reversing the thread guides 484 and 485 for the remainder of the finishing courses $e'$ and in readiness for the leg of the next stocking. During the knitting of the toe, the gear 6 and hub 7 are at the limit of their movement toward the right (Fig. 6) which holds stud 524 out of reach of detent 521, but when the toe is completed and gear 6 and hub 7 are slid to the left (Fig. 6) to change onto continuous rotary, the path of stud 524 is shifted so that at the completion of the single slack course it will engage the detent.

The machine herein shown is arranged so as to knit a one color split foot stocking with high spliced heel and therefore the finger 522 above described as secured to tension lever 92, takes no part in the production of such a stocking, but when the machine is adjusted as hereinafter described to knit a stocking with a plain foot, that is, with a foot knit by continuous rotary motion of cylinder 1, then the movement of lever 92 toward wheel 23 at the start of the foot causes finger 522 to operate detent 521 and free rocker 304 so that the thread guides 484 and 485 will be reversed at this time. A rocking slide 527 hereinafter described holds the lever 177 in inoperative position during the knitting of the leg of the stocking.

The operation of the mechanism so far as needs to be further described, is as follows: During the knitting of the leg of the stocking, the cam cylinder 1 is traveling in the direction of the arrow $y$ (Figs. 32 and 51) and all of the needles and both sets of knitting cams are in action, the butts of the needles relatively traversing the cam cylinder on the path indicated by the arrows in Fig. 51. Therefore, switch 381 occupies its retracted inoperative position; lifters 384 are locked by their latches in their inoperative positions; switch cam 392 is in action; trailer cam 386 is idly trailing around on top of cam cylinder 1 against the outer ends of the butts of the needles; droppers 402 are locked by their latches in their inoperative positions, and the switch cam 403 occupies its innermost operative position shown in Fig. 38 where it engages all of the butts of the needles. At this time came 382 are knitting with thread delivered by thread guide 485, while cams 383 are knitting with thread delivered by guide 503. Therefore, during the knitting of the leg down as far as the beginning of the high splice, the machine operates with a double feed.

The thread guides 485 and 503 may supply threads or yarn of similar character, while the thread guide 484 may control a doubled thread or yarn for use in knitting the high splice, heel, foot and toe of the stocking shown in Fig. 1, and as the cam cylinder 1 shifts onto reciprocating motion at the beginning of the high splice the thread guide 485 is thrown out of action and the thread guide 484 into action. Owing, however, to the lost motion joint between rockers 480 and 481 and their thread guides, said thread guides momentarily both occupy operative positions at the same time, so that in whichever direction the two thread guides are shifted, the new thread is knit for a few stitches with the old thread before the latter is thrown out. This prevents the thread feed from skipping any of the needles during the changing of the feed.

When the top of the high splices is reached, cam 56 of wheel 23 shifts the control over onto wheel 24 and the latter makes two step movements and cam 59 thereof shifts the control back onto wheel 23 as above described, the first step movement of wheel 24 acting to reduce the speed of cam cylinder 1 and the second to change onto reciprocating motion. This second step movement of wheel 24 ends at the start of the first course of the high splice and causes cam 309 to act through lever 307 to shift controller ring 299 one step in the direction of the arrow, Fig. 52, thereby raising lever 339 so that cam 370 coöperates with pins 372 and 379 and lifters 384 are thrown into action. The operation of the pickers at this time will not result in a narrowing of the fabric until the completion of the high splice $b$ shown in Figs. 1 and 2 because the lowering cams 398, 399 are then in their inner positions toward the axis of the cylinder and so as to cause the medium butt needles to be brought down by cam 399 to position to be actuated by switch cam 403. At the same time the arm 338 on lever 339 acts through pin 336 to reverse the cams of box 320, one of which acts, first through arm 420, Fig. 38, to retract switch cam 403 by shifting it from the position shown in Fig. 38 to the position shown in Fig. 39, and, second, through lever 375$^a$ on cylinder 1 to throw cam 381 into operative position. This cam 381, as stated above, coöperates only with the long butts as is the case also with trailer cam 386.

As cylinder 1 is traveling in the direction of the arrow $y$ and completing the last revolution before starting to reciprocate, the cam 326 throws cam 381 into operative position just before cam 381 reaches the left hand end of the long butt series of needles and consequently as cam 381 passes under the long butts, it throws those needles up so that their butts pass over knitting cams 382, which allows the following trailer cam 386 to be thrown sidewise by its spring 389 into operative position. Cylinder 1 stops its continuous rotary motion in the position shown in Fig. 32 with both cams 381 and 386 in operative positions cam 403 retracted but operative and then starts, in the direction indicated by arrow $x$, to reciprocate with lifters 384 in action, with cams 398 and 399 occupying their innermost positions, with droppers 402 out of action and with both sets of knitting cams in action. As cylinder 1 travels in the direction of arrow $x$, the lifter 384 in advance of cams 382 engages the medium butt needle 369 and lifts it up into the same plane with the long butt needles so that it passes over the cams 382 without knitting, but is immediately thereafter drawn down again with the long butt needles into the plane of the knitting cams 382 by the lowering cam 398. The knitting cams 382 now reach and operate the series of short butt needles and also the medium butt needle 368, lifter 384 which raised medium butt needle 369 having been locked in its inoperative position by its latch when it raised medium butt needle 369. As the trailer cam 386, traveling in advance of cams 382 reaches and passes under the long butt series of needles adjacent needle 368, the long butt needles are deflected upward over the knitting end of the cams 382 and then down again by cam 398 until knitting cams 382 reach the position shown in Fig. 32 from which they started. Here the direction of movement of cam cylinder 1 is reversed and cams 382 start back in the direction indicated by the arrow $y$, the long butt needles being thrown over knitting cams 382 by cam 381 and down again after passing cams 382, by cam 399. As knitting cams 382, traveling in the direction of arrow $y$ near the medium butt needle 368, the latter is lifted by the lifter 384 traveling in advance of cams 382 and is caused thereby to pass idly over cams 382 with the long butts and, with the long butt needles, to be immediately thereafter lowered again into the plane of cams 382 by lowering cam 399. Cams 382 now traverse and actuate the short butt needles and the medium butt needle 369 and when they reach their starting point the cylinder movement is reversed and the operation is repeated. It will thus be seen that the cams 382 only actuate one of the two medium butt needles for each swing of cylinder 1 and that this medium butt needle is actuated as the cams 382 leave the short butt series.

At the start of the high splice the knitting cams 383 (Fig. 32) travel to the right with the short butt needles passing idly in front of the switch cam 403 without being engaged by the latter. When said cams 383 reach medium butt needle 368 the latter is engaged by the switch cam 403 so that said medium butt needle is actuated with the long butt needles, as is also the medium butt needle 369 at the opposite side of the cylinder when reached by cams 383. When the knitting cams 383 reach the position from which they started, the movement of cam cylinder 1 is reversed and they travel back to their first position again in the direction of the arrow $y$, again actuating the two medium butt and all of the long butt needles as they pass. The knitting cams 383 continue to operate in this fashion throughout the high splice and foot. The result of this mode of operation of the two sets of cams is the production of the two piece fabric shown in Fig. 67 where it will be seen that the joint consists of pairs of stitches produced by cams 383 alternating and inter-knitting with single stitches produced by cams 382.

Upon the completion of the high splice, the control is transferred by cam 55 of wheel 23 to wheel 24 and the latter starts upon the completion of the revolution which was begun by the two steps at the beginning of the high splice. The first step movement of control wheel 24 at this time causes cam 309 to act through lever 307 and connected parts to shift controller ring 299 a second step in the direction of the arrow (Fig. 52) which acts through arms 351 and 361, rock shafts 352 and 362, and pins 350 and 360 to reverse the cams of cam boxes 321 and 322. During the last reciprocation of cam cylinder 1 at the completion of the high splice, cam box 322 thus reversed acts through lever 415 to withdraw cam slide 417 (Fig. 39) whereupon spring 419 lifts switch cam 403 into its wholly inoperative position shown in Fig. 40, which renders knitting cams 383 wholly inoperative. During this last reciprocation of cam cylinder 1, at the completion of the high splice, the cam box 321, thus reversed, acts through levers 428, 434 and 457 to retract the lowering cams 453, 398 and 399, in the order named, so that all three will clear the medium and short butt needles during the narrowing and widening of the heel and toe. This leaves the medium butt needles down on the same plane with the short butt needles so that while they are used in knitting the heel, and toe also, they are the first needles to be thrown up out of action in narrowing at the heel, and toe also. The lifters 384 though constructed and controlled in novel manner, operate upon the ends of the short butt series to effect the narrowing in the usual manner. During the knitting of the heel, the wheel 24 is stepped around by its actuator and at the completion of the narrowing operation, a rise $309^c$ in cam 309 acts through lever 307 and connected parts to shift controller ring 299 another or third step in the direction of the arrow, (Fig. 52), thereby lifting lever 375 so as to bring its cam 376 into position to cooperate with the pins 378 and 379 through which the latches 444 of droppers 402 are operated. This throws the droppers 402 into action and effects the widening operation at the heel, while wheel 24 completes its revolution begun by two steps at the start of the high splice.

At the completion of the heel, cam 58 shifts the control onto wheel 23 and the wheel 24 is stopped at its normal starting or zero position. In order to prevent lever 307 from returning to its original position as wheel 24 completes its first revolution, the spring pressed plunger latch $115^b$ (Fig. 6) is provided, which at the start of the high splice when wheel 24 makes its two step movements to shift onto reciprocating, is carried by shipper lever 115 into position immediately above the rear arm of lever 307 where it remains until the completion of the toe when shipper lever 115 is thrown back to its first position. This spring plunger latch $115^b$ is positioned relatively to lever 307 so that as the heel is completed and the cam 309 falls away from stud 308, the spring plunger 115^b will hold lever 307 in the position it occupies at the end of its first step movement produced by cam 309. This properly adjusts the cam boxes 321 and 322 as well as cam arm 311 for the operation of knitting the foot and maintains said parts in the same condition they were in during the knitting of the high splice. At the completion of the heel cam 58 shifts the control over onto wheel 23, and the foot of the stocking is knit in the same fashion as that part of the stocking at the high splice. Also when the wheel 24 completes its first or "heel" revolution, its cam 117 (Fig. 28) throws slide 114 in a direction to reverse shipper lever 115, (Fig. 6), but at this time abutment 124 on wheel 23 (Fig. 18) is in engagement with supplemental slide 120 (Fig. 11), and pawl 119 is held by stud 121 in an elevated inoperative position so that lever 115 is not operated by said pawl.

At the completion of the heel, and toe also, a few of the needles used in making those parts of the stocking are left elevated out of the plane of the knitting cams which would not be reached in time by the lowering cams 398 and 399, and therefore I provide the third lowering cam 453 in order to throw these needles down at the proper time after the completion of the heel, and toe also.

Cam 168 is placed on wheel 24 so as to shift lever 161 (Fig. 10) from cam 156 onto cam 157 while roll 50 is on incline 160 just at the completion of the narrowing operation at the heel or toe and as a result cam 157 will act through lever 161 to free actuator 48 from latch 158 as incline 159 passes under cam roll 50. This permits cam 159, in swinging back on the next stroke of arm 49, to act through actuator 48 to shift wheel 24 and cause section 309^c of cam 309 to shift controller ring 299 its third step at just the right time in the swing of cylinder 1 with relation to the cam boxes so as to change from narrowing to widening with the widening operation beginning at the same side of the short butt series at which the narrowing operation began. That is to say, in narrowing, the lifters 384 act to throw the needles at the ends of the short butt series including the medium butt needles, up out of action one at a time alternately, first from one end of said series and then from the opposite end and the droppers start at one end of the short butt series to produce the widening at the same time that one of the lifters is finishing the narrowing at the opposite end of the series, and it is for this reason, that is to start the widening at the proper time, that cam 168 is caused to act through swinging frame 162 so as to cause cam 159 acting through actuator 48 to shift cam section 309^c into engagement with lever 309 at the proper moment at the completion of the narrowing.

As the knitting of the foot under control of wheel 23 nears completion, the control is shifted by cam 54 (Fig. 17) onto wheel 24, and as wheel 24 makes its first step movement, the cam 59 (Fig. 26) throws the control back onto wheel 23. Thereupon wheel 23 makes the next to the last step movement of its revolution and the cam 53 on said wheel (Fig. 17) immediately throws the control back onto wheel 24 which now completes its second or "toe" revolution. It will thus be seen that the cam 53 is provided to counteract at this time, the effect of cam 59 on wheel 24, which cam 59 is provided in order to shift the control back onto wheel 23 for the knitting of the high splice, and that its action in returning control to wheel 23 at the start of the toe is merely incidental to its presence on wheel 24 and should be counteracted at this time by cam 53 or its equivalent so that wheel 24 will control the knitting of the toe. Also, it will be clear that the same conditions on the cam cylinder 1 and in the cam boxes exist during the knitting of the heel and toe and that both operations are alike.

During the last course of the high splice or foot when lowering cams 453, 398 and 399 are retracted in the order named and switch cam 403 is shifted into the position shown in Fig. 40, where it is wholly inoperative, the medium butt needle 368 will be the last needle operated by cams 383 and the medium butt needle 369 will be the last needle operated by cams 382 in knitting the high splice, or foot. Therefore, at the start of the knitting of the heel, or toe, medium butt needle 369 will be thrown over cams 382 by the lifter 384 in advance of said cams and will therefore hold its loop, whereas the loop left on medium butt needle 368 by cams 363 will be knit off from said needle 368 by cams 382 when the latter reach said needle and therefore the thread for cams 383 will, during the knitting of the heel and toe, be entirely free and clear of the needle and extend from the knitted fabric to its guide so that it cannot be injured by the action of the sinkers as has been the case heretofore where it has always been left hanging on one of the needles during these two stages of the operation and liable to be cut by the sinkers.

As the foot is being completed, the cam 504^a comes into engagement with lever 110 and shifts tension lever 92 toward wheel 24, and while the toe and the first few finishing courses e' are being knitted, the cam 504^a on wheel 23 holds tension lever 92 in this position with arm 94 in position to coöperate with rise 504 during the finishing courses after the toe.

As the toe is completed and cam 117 (Fig. 28) shifts slide 114 toward wheel 24, the pawl 119 at this time operates shipper 115 and changes the motion of the cam cylinder back onto continuous rotary motion, since the abutment 124 was carried away from supplemental slide 120 at the start of the foot. The machine now knits the finishing courses $e'$ and automatically stops with both wheels 23 and 24 back at their starting points, the rise 504 on wheel 24 coöperating with arm 94$^a$ to loosen the stitches of the first, or first few, courses of the finishing courses $e'$ as described.

The leg of the stocking of Fig. 1 down as far as the beginning of the high splice is knit with a double feed, each of which may be a single thread, and one of these threads is delivered to the needles by the tube 493 of guide 485 while the other is delivered by the guide 503. When the high splice $b$ is reached, thread guide 485 is thrown out of action and thread guide 484 into action as stated, and the parts $b$ and $b'$ of the stocking are knit, guide 503 supplying thread to the front series of needles for the part $b'$ and the guide 484 supplying a two-ply reinforced thread to the rear series of needles for the high splice $b$. The yarn from the bobbin $w^2$ unites with the yarn from the bobbin $w'$ and this reinforced or doubled thread extends over the tension arm 225, Fig. 4, and thence down to the knitting devices. Therefore the high splice $b$ is knit with this doubled or two-ply thread while the front portion of the ankle is knit by the single thread supplied from bobbin $w^4$. At the completion of the high splice $b$, the front series of needles are thrown out of action and the narrowing and widening devices automatically thrown into action as described, the heel being now knit by the rear series of needles with the doubled or two-ply thread from guide 484. The first step movement of wheel 24 at the start of the heel carries the rise 179$^a$ of cam 179 idly past the stud 178 on lever 177. The next step movement of wheel 24 carries the rise 179$^a$ past the stud 178 (Fig. 9) and restores the parts connected with lever 177 to the position shown in the drawings. At the completion of the heel, the thread is severed from bobbin $w'$ and the sole of the foot is knit with thread from bobbin $w^2$ alone. The sole of the foot of the stocking is knit with the same two-ply thread and thread guide as the heel except for the absence of the reinforce thread $w'$, which was cut out, as just described, at the completion of the heel, while the top of the foot is knit with thread from bobbin $w^4$.

Throughout the knitting of the leg of the stocking the reinforce thread controlling lever 177 is held inoperative in a position intermediate the extremes of its movement by a locking slide 527 (Figs. 5 and 6) movably secured to bracket 87 by two screws 528 extending through slots in said locking slide. This slide 527 is moved in one direction by a pawl 529 carried by slide 114 coöperating with a shoulder 530 on said slide, and in the opposite direction by a spring 531 whereof one end is connected with slide 527 and the other end detachably connected with a pin 532 on bracket 87. The pawl 529 is pivotally mounted upon the stud 533 which also supports the pawl 119, and is made with a cam slot 534 through which the stud 121 extends. Upon the occasion of the second of the two step movements which wheel 24 makes at the start of the high splice when the slide 114 is shifted toward wheel 23 by cam 113 on wheel 24, at which time stud 121 is held stationary with supplemental slide 120 by abutment 124 on wheel 23, the cam slot 534 of pawl 529 acts on pin 121 to lower pawl 529 behind shoulder 530 of locking slide 527 and the latter is pushed by pawl 529 out of locking engagement with lever 177. Now, since slide 114 is not moved back toward wheel 24 by the latter until the heel is finished, reinforce thread controlling lever 177 will remain entirely free of locking slide 527 until that time. But, just before slide 114 is shifted back toward wheel 24 at the completion of the heel, the drop 179$^b$ of cam 179 on wheel 24, Fig. 9, reaches stud 178 thereby allowing spring 236 to cut out the reinforce thread $w'$ as described. When slide 114 is shifted toward wheel 24 at the completion of the heel slide 527 tends to move back with it but is arrested by the rear arm of lever 177 which is then elevated and in its path. The foot of the stocking is now knit under the control of wheel 23 as described, with stud 178, Fig. 9, at the bottom of the drop 179$^b$ of cam 179, and with locking slide 527 held against the side of the rear arm of lever 177 by its spring 531, slide 114 being at the limit of its movement toward wheel 24 during this period. The first step movement of wheel 24 at the start of the toe causes cam 179, Fig. 9, to swing reinforce thread controlling lever 177 into its intermediate position again whereupon the spring 531 shifts slide 527 into locking position above the rear arm of said lever 177 where it remains until the high splice of the next stocking is reached, because when slide 114 is immediately thereafter shifted toward wheel 23 by the second step movement of wheel 24 at the start of the toe, the abutment 124, Fig. 5, is not then in the path of supplemental slide 120 and therefore pawl 529 is held elevated and inoperative by stud 121. At the start of the toe when the wheel 24 makes its third step movement, the thread $w'$ is twisted around the two-ply thread $w^2$ so that the toe is knit with the reinforcing thread $w'$ combined with two-ply thread $w^2$. At the completion of the toe, the thread from $w'$ remains compounded with two-ply thread $w^2$ until the completion of the next heel, said threads hanging loosely within the tubular fabric produced by the machine from the toe of one stocking to the high splice of the next. At the completion of the toe, the motion of the cam cylinder is shifted back on to continuous rotary and the few finishing courses $e'$ are knit with thread from bobbins $w^3$ and $w^4$ and then the machine automatically stops as heretofore described.

During the knitting of the leg of the stocking including the first part of the high splice the tension, or length of loops produced by the needles, is controlled by the cam flange 97 of wheel 23 acting through arm 95 of tension lever 92 and therefore the stop screw 104 serves as a means for regulating the tension effects of cam flange 97. During the knitting of the last part of the high splice, the cam flange 97 falls away so as to leave the tension lever 92 supported by stop screw 99 resting against bracket 87, so that said screw 99 controls the tension during the knitting of the last part of the high splice and of the foot, and as said screw is adjustable, the tension may be regulated as desired. During the knitting of the heel and toe, the tension or length of loops produced by the needles is controlled by cam flange 96 of wheel 24 acting through arm 94 and tension lever 92, and therefore stop screw 106 serves as means for regulating the tension effects of cam flange 96. Thus it will be seen that the tension for the different periods of the operation of the machine may be separately and independently varied or regulated at will which is a novel feature of practical importance.

The control of the threads in knitting the stocking of Fig. 1 is appropriate for a one color article having a high splice, a double sole and reinforced heel and toe.

The cams 53 and 54 on wheel 23 are part of a disk $54^a$ (Fig. 17) which is adjustably secured in a circular recess in the side of said wheel with its outer side flush with the side of wheel 23, by a screw $54^b$ and a pin $54^c$ on said wheel, said pin engaging one of a pair of holes $54^d$ arranged at opposite sides of a screw $54^b$. The disk $54^a$ carries a third cam $54'$ situated on said disk so that it is 180° from cam 54 of which it is a counterpart. By loosening screw $54^b$, disk $54^a$ can be disengaged from pin $54^c$, turned 180° so that pin $54^c$ engages the other hole $54^d$ and screw $54^b$ tightened again. The effect of this adjustment is to remove the cams 53 and 54 from operative position and substitute cam $54'$ for cam 54. The cams 56 and $504^a$ are on a similar disk $56^d$ likewise fastened to wheel 23 by a screw $56^b$ and pin $56^c$; the latter adapted to engage either of two holes $56^a$ in disk $56^d$ so that the latter can be adjusted 180° to shift cam 56 into and out of operative position but without disturbing the effect of cam $504^a$. This is because the disk $56^d$ has two cam portions $504^a$ either one of which possesses the same function as the other, so that rotation of the disk only puts cam 56 out of action.

The cam 59 on wheel 24 is on a plate $59^a$ (Fig. 26) adjustably connected with said wheel by two screws $59^b$ and $59^c$, the latter extending through a slot in said plate so that by loosening screw $59^c$, and adjusting plate $59^a$, a shoulder $309^f$ can be shifted into an operative position where it has the effect of advancing the rise $309^d$ half a step of wheel 24, and at the same time cam 59 is moved into an inoperative position. The third rise $309^c$ is a plate secured to wheel 24 with provision for angular adjustment to the extent of one step of said wheel, by screws $309^e$, passing through slots in said plate.

The stocking shown in Fig. 2 is structurally the same as the stocking shown in Fig. 1, except in one important respect, which is that it has a plain seamless foot. The only adjustment that it is necessary to make in order to cause the machine to produce this stocking of Fig. 2 is to retract stud 121 so that it occupies an inoperative position relatively to pawl 119 which causes shipper lever 115 to be returned to "continuous rotary" position by wheel 24 at the completion of the heel instead of remaining in "reciprocating" position as with the stocking of Fig. 1.

The stocking shown in Fig. 3 is structurally the same as that shown in Fig. 1 except that it has no high splice, and my improved knitting machine may be adapted to produce this stocking of Fig. 3 by adjusting it as follows:—Reverse the disks $54^a$ and $56^d$ on wheel 23 so as to place cams 53 and 56 in their inoperative positions; move plate $59^a$ on wheel 24 inward so that shoulder $309^f$ is in operative position and cam 59 in its inoperative position; advance plate $309^c$ of wheel 24 an angular distance equal to one tooth of said wheel and advance plate $179^c$ of wheel 24 the same angular distance on said wheel.

The control of the thread in knitting the stocking of Fig. 3 is appropriate for a stocking having a reinforced heel and toe whose leg, instep and finishing courses are of one color or shade, as black, and whose heel, sole and toe are of another color or shade as white.

The stocking shown in Fig. $3^a$ is structurally the same as the stocking shown in Fig. 3 except that it has a plain foot knit by continuous rotary motion of the cam cylinder with double feed during the knitting of the leg, foot and finishing courses. This stocking may be produced by my machine by making the adjustments just described for the stocking of Fig. 3, and in addition retracting stud 121 to place it out of coöperative relation with pawl 119. To knit this stocking of Fig. 3ª with single feed in leg and foot the adjustments just described for the double feed are made and in addition switch cam 403 is shifted into its wholly inoperative position, and stud 421 into its inoperative position. The control of the threads when knitting this stocking of Fig. 3ª is appropriate for a stocking having a reinforced heel and toe whose leg, foot and finishing courses are of one shade or color, as black, and whose heel and toe are of another shade or color, as white. When the machine is adjusted for knitting this stocking of Fig. 3ª under a double feed and said stocking is to be made with a leg and foot of one color or shade, as black, and a heel and toe of another color or shade, as white, then the two bobbins $w^3$ and $w^4$ will deliver black thread to guides 485 and 503 while a two ply or reinforced white thread will be delivered to guide 484 from two bobbins $w^2$. Since under these conditions, the two ply thread is thrown out after the heel and toe the cutter and twister are unnecessary and may be rendered inoperative by shifting stud 178 into its inoperative position, and leaving it there while producing goods of this class. Also by unhitching spring 531 from pin 532 locking slide 527 may be rendered inoperative when the machine is adjusted for this class of goods. In knitting this stocking of Fig. 3ª with a single feed, the bobbin which delivers to guide 503 is omitted and a sufficient number of jacks are added to the wheel 23 to compensate for such omission. Therefore, by means of the adjustments described for knitting the stocking of Fig. 3, and by then raising stud 421 above the plane of cam box 322 (so that said cam box will not throw lever 415 to return slide 417 inwardly), and omitting the bobbin which delivers to guide 503, and adding sufficient jacks to wheel 23, I am able to adapt the same machine for knitting with single feed. The adjustable stud is held in raised position, to clear cam box 322 by means of a spring shown in Fig. 37ª. In said figure, the stud is lowered, and the spring is in engagement with the upper one of two annular grooves formed in the stud. By simply pulling the stud up, the spring will snap into the lower groove and the stud will remain up.

The stocking of Fig. 3ᵇ is structurally the same as the stocking of Fig. 3ª and like the latter may be knit with a single or double feed in leg, foot and finishing courses, but is entirely of one shade or color. In order to cause the machine to produce this stocking, the same adjustments are made as for knitting the stocking of Fig. 3 with single or double feed and thread of the proper color employed.

To produce a one color stocking like that of Fig. 3ᵇ by a double feed but without reinforcing the heel and toe, only two bobbins delivering to guides 484 and 503 are employed and the machine is adjusted as for knitting the stocking of Fig. 3ª except that cam lever 113 is locked by a screw 113ª in its uppermost position to render the yarn changing devices inoperative. To produce a one color stocking like that of Fig. 3ᵇ by a single feed, but without reinforcing the heel and toe a single bobbin, delivering to thread guide 484, is employed and the machine is adjusted as for knitting the stocking of Fig. 3ª except that cam lever 113 is locked by screw 113ª in its uppermost position.

As shown at 535 in Fig. 51, the ledge of the cam cylinder for the needle butts, is upwardly inclined each side of the throat or entrance above the long butt knitting cam 383, and the ends of the inclined surfaces terminate in beveled surfaces 536. When the switch cam 403 is withdrawn, as hereinbefore described, the structure just described insures the needle butts leaping over the throat on account of the relative speed of movement of the cam cylinder. If a needle butt should drop a little from the place to which it is elevated by one incline 535, it will be thrown up again by the opposite beveled tip 536.

I claim:—

1. A knitting machine having two wheels, means for actuating said wheels independently of each other, one of the wheels having means for controlling the length of the stocking and the other wheel having means for controlling other operations of the machine, each of said wheels also having means for controlling the shifting of the actuation over to the other wheel.

2. A knitting machine having two wheels, means for actuating said wheels independently of each other, one of the wheels having means for controlling the length of the stocking and the other wheel having means for controlling all of the other operations of the machine, each of said wheels also having means for controlling the shifting of the actuation over to the other wheel.

3. A knitting machine having two wheels, means for actuating said wheels independently of each other, one of the wheels having means for controlling the length of the stocking and the other wheel having adjustable cams for controlling other operations of the machine, each of said wheels also having means for controlling the shifting of the actuation over to the other wheel.

4. A knitting machine having two wheels, intermittently operable means for actuating each of said wheels independently of the other, one of the wheels having means for controlling the length of the stocking and the other wheel having means for controlling other operations of the machine, each of said wheels also having means for controlling the shifting of the actuation over to the other wheel.

5. A knitting machine having two wheels provided with variable controlling devices for knitting different varieties of hosiery, means for actuating said wheels independently of each other, connections under the control of the devices of one wheel for determining the length of the article knit, and connections under the control of the devices of the other wheel for determining other operations of the machine, each of said wheels also having means for controlling the shifting of the actuation over to the other wheel.

6. A knitting machine having two wheels, means for actuating said wheels independently of each other, one of the wheels having means including removable jacks for controlling the length of the stocking and the other wheel having means including removable jacks and adjustable cams for controlling other operations of the machine, each of said wheels also having means for controlling the shifting of the actuation over to the other wheel.

7. A knitting machine having two wheels, pawls to rotate said wheels, one of the wheels having means for controlling the length of the stocking and the other wheel having means for controlling other operations of the machine, each of said wheels also having means for shifting its own actuating pawl out of operative position and permitting the pawl of the other wheel to operate.

8. A knitting machine having two wheels, pawls to rotate said wheels, one of the wheels having means for controlling the length of the stocking and the other wheel having means for controlling other operations of the machine, each of said wheels also having means for shifting its own actuating pawl out of operative position and permitting the pawl of the other wheel to operate, the length-controlling wheel having means whereby its speed of movement may be increased during a portion of its rotation.

9. A knitting machine having two wheels, pawls to rotate said wheels, one of the wheels having means for controlling the length of the stocking and the other wheel having means for controlling other operations of the machine, each of said wheels also having means for shifting its own actuating pawl out of operative position and permitting the pawl of the other wheel to operate, said pawl-shifting means comprising variable coöperative members carried by the wheels and pawls.

10. A knitting machine having a control wheel, an actuator having a pawl to rotate said wheel, and means for automatically throwing said pawl out of operative position at predetermined times, said means comprising a plurality of jacks carried by the wheel and a plurality of toothed members carried by the pawl.

11. A knitting machine having two wheels, independent swinging actuators having pawls to rotate said wheels, one of the wheels having means for controlling the length of the stocking and the other wheel having means for controlling other operations of the machine, each of said wheels also having means for shifting its own actuating pawl out of operative position and permitting the pawl of the other wheel to operate.

12. A knitting machine having two control wheels, independent swinging actuators having pawls for rotating said wheels, and means for automatically throwing said pawls out of operative position at predetermined times, said means comprising a plurality of jacks carried by each wheel, and a plurality of toothed members carried by the pawls.

13. A knitting machine having two control wheels, independent swinging actuators having pawls for rotating said wheels, and means for automatically throwing said pawls out of operative position at predetermined times, said means comprising a plurality of differently shaped jacks movably connected with each wheel, and a plurality of notched members carried by the pawls.

14. A knitting machine having two wheels, means for actuating said wheels independently of each other, one of the wheels having means for controlling the number of courses in the heel and toe portions of the product and the other wheel having means for controlling the number of courses in the other length portions of the product, each of said wheels having means for controlling the actuation over to the other wheel.

15. A knitting machine having two wheels, means for actuating said wheels independently of each other, one of the wheels having means for controlling the number of courses in the heel and toe portions of the product and the other wheel having means for controlling the number of courses in the other length portions of the product, each of said wheels having means for controlling the actuation over to the other wheel, and means including a plurality of jacks carried by the wheels for varying the speed relationship of the said wheels.

16. A knitting machine including in its construction a control wheel having slots elongated radially, jacks seated in said slots and having recesses, and an endless elastic band engaging the recesses of the jacks, the wheel being provided with an annular groove for said band.

17. A knitting machine having a control wheel, a swinging actuator having a pawl to rotate said wheel, and means for automatically increasing the speed of rotation of said wheel beyond that imparted by said pawl, said means comprising displaceable abutments carried by said wheel, a pawl to engage the abutments when in operative positions, and means for continuously operating said pawl.

18. A knitting machine having a control wheel, a swinging actuator having a pawl to rotate said wheel, and means for automatically increasing the speed of rotation of said wheel beyond that imparted by said pawl, said means comprising a second pawl, means for imparting to said second pawl, a greater effective throw than that of the first pawl, and displaceable abutments carried by the wheel to be engaged by said second pawl.

19. A knitting machine having a control wheel, a swinging actuator having a pawl to rotate said wheel, and means for automatically increasing the speed of rotation of said wheel beyond that imparted by said pawl, said means comprising a second pawl, means for imparting to said second pawl a greater effective throw than that of the first pawl, and abutments carried by the wheel to be engaged by said second pawl, said abutments comprising pins mounted in said wheel and having grooves, an endless spring band engaging said grooves being engaged with the wheel and permitting the pins to be shifted to and from operative position.

20. In a knitting machine, the combination with the needle cylinder thereof, of two control wheels below the said cylinder, means for actuating said wheels, a standard between said wheels, a rock-shaft mounted on the standard and having a lever, a vertical slide mounted in bearings of the standard and adapted to be raised by said lever, connections between said slide and the needle cylinder to control the tension according to the position of the slide, a shipper lever, a horizontal slide carried by said standard and connected to the shipper lever, and a cam on one of the control wheels for controlling the horizontal slide.

21. In a knitting machine, the combination with the needle cylinder thereof, of two control wheels below the said cylinder, means for actuating said wheels, a standard between said wheels, a rock-shaft mounted on the standard and having a lever, a vertical slide mounted in bearings of the standard and adapted to be raised by said lever, said slide having a yoke at its upper end, said yoke supporting the needle cylinder, a shipper lever, a horizontal slide carried by said standard and connected to the shipper lever, and a cam on one of the control wheels for controlling the horizontal slide.

22. In a knitting machine, the combination with the needle cylinder thereof, of a control wheel, means for imparting to said wheel two rotations during the knitting of a stocking, a lever and connections therefrom to the cylinder to raise and lower the latter to vary the tension of the stitches, and means for shifting the lever to cause it to occupy different lateral positions during the two rotations of said control wheel.

23. In a knitting machine, the combination with the needle cylinder thereof, of a lever and connections therefrom to the cylinder to raise and lower the latter to vary the tension of the stitches, means for shifting the lever to cause it to occupy different lateral positions, and a control wheel having a peripheral recess to receive one end of said lever when in one of its laterally shifted positions.

24. In a knitting machine, the combination with a slide having a belt shipper, of means for changing the speed of the cam cylinder of the machine according to the position of said slide, a wheel, and means under the control of said wheel for actuating said slide, said means including toggle levers adapted to remain in normal or straight positions during the operation of the slide for changing speed, and a lever for breaking said toggle levers to stop the machine.

25. A knitting machine having a cam cylinder provided with a throat between two knitting cams, the ledge at each side of the throat being upwardly inclined toward said throat, and a switch cam movable only radially and vertically in said throat, the inclination of said ledge serving to insure the needle butts leaping over the throat when the switch cam is withdrawn.

26. A knitting machine having a cam cylinder provided with a throat between two knitting cams, the ledge at each side of the throat being upwardly inclined toward said throat, the ends of the ledge each side of the throat being beveled, and a switch cam movable only radially and vertically in said throat, the inclination of said ledge serving to insure the needle butts leaping over the throat when the switch cam is withdrawn.

27. A knitting machine having its cam cylinder provided with a switch cam and a lowering cam closely adjacent thereto, said switch cam comprising a laterally movable base having a projecting portion that is inclined relatively to said base, and means for shifting said switch cam to and from operative position without disturbing the said adjacent lowering cam.

28. A knitting machine having its cam cylinder provided with a switch cam and a lowering cam closely adjacent thereto, said switch cam comprising a lever pivoted on a vertical axis to said cylinder and having a laterally projecting inclined end, and means for shifting said switch cam to and from operative position without disturbing the said adjacent lowering cam.

29. A knitting machine having a needle cylinder, an internal removable cylindrical support therefor, the cylinder being vertically movable on said support, needles mounted in the needle cylinder and having their butts projecting outwardly, means for raising and lowering the needle cylinder relatively to said support, and a skeleton cylinder carried by said needle cylinder support and removable therewith, the needle butts being guided by said skeleton cylinder.

30. A knitting machine having a needle cylinder, an internal removable cylindrical support therefor, the cylinder being vertically movable on said support, needles mounted in the cylinder and having their butts projecting outwardly, and a skeleton cylinder carried by said needle cylinder support and removable therewith, the needle butts being guided by said skeleton cylinder, said skeleton cylinder comprising a circular series of vertical bars with spaces between them for the needle butts.

31. A knitting machine having a needle cylinder provided with grooves for the bodies of the needles, a cam cylinder, a skeleton cylinder for guiding the butts of the needles, said skeleton cylinder comprising a circular series of spaced vertical bars having notched upper ends, a base ring to which the lower ends of the bars are secured, a top ring having radial grooves or recesses for the upper ends of the bars, and a contractile band carried by said top ring and engaging the notches of the bars.

32. A knitting machine having a needle cylinder provided with grooves for the bodies of the needles, an internal removable support for said cylinder, said support having an annular groove or recess, a circular series of spaced bars for guiding the butts of the needles carried by said removable support, a filling in said groove or recess securing the lower ends of said bars, and means for holding the upper ends of said bars.

33. A knitting machine having a needle cylinder provided with grooves for the bodies of the needles, an internal removable support for said cylinder, said support having an annular groove or recess, a circular series of spaced bars for guiding the butts of the needles carried by said removable support, a filling in said groove or recess securing the lower ends of said bars, a ring having recesses for the upper ends of the bars, and means for removably holding said ring in position.

34. A knitting machine having a frame, a bed plate for the needle cylinder, said bed plate being secured to the frame and having a ring provided with an inwardly projecting flange at its lower end, and a needle cylinder support and a skeleton cylinder, both supported by said flange and removable therefrom as a unit, the needle cylinder being vertically movable on said support.

35. A knitting machine having a bed plate, a shifter box supported by said bed plate, two cam arms mounted on said box, said cam arms being connected to positively lower one when the other is raised, a single spring for normally actuating the arms in one direction, and means for positively actuating the arms in the other direction.

36. A knitting machine having a bed plate, a plurality of shifter boxes supported by said plate, two cam arms mounted on each of said boxes, said boxes being constructed to support said arms at different heights, said cam arms being connected to positively lower one when the other is raised, a single spring for normally actuating the arms in one direction, and means for positively actuating the arms in the other direction.

37. A knitting machine having two wheels, means for actuating said wheels independently of each other, one of the wheels having means for controlling the length of the stocking and the other wheel having means for controlling other operations of the machine, each of said wheels also having means for controlling the shifting of the actuation over to the other wheel, both of said wheels also having adjustable cams for controlling the knitting of high spliced heel portions.

38. A knitting machine of the character described comprising two control wheels, one for controlling the knitting of the leg and foot of the stocking and the other for controlling the knitting of the heel and toe of the stocking, means for imparting to the latter wheels two rotations during the knitting of a stocking, a single tension regulating member controlled by said wheels to regulate the stitch length during the knitting of the stocking, and means for shifting said member to cause it to occupy different lateral positions during the two rotations of the wheel which controls the knitting of the heel and toe.

39. A knitting machine having two wheels, means for actuating said wheels independently of each other, one of the wheels having means for controlling the length of the stocking and the other wheel having means for controlling other operations of the machine, each of said wheels also having means for controlling the shifting of the actuation over to the other wheel, a set of retarding jacks removably mounted on one of said wheels, and mechanism in the path of movement of the jacks and operated thereby to vary the operation of the wheel-actuating means.

40. A knitting machine of the character described comprising a control wheel, a pawl for actuating said wheel, a toothed wheel rotatably mounted on the pawl, and retarding jacks removably mounted on the control wheel and coöperating with the toothed wheel.

41. A knitting machine of the character described comprising a control wheel, a pawl for actuating said wheel, a toothed wheel rotatably mounted on the pawl, retarding jacks removably mounted on the control wheel and coöperating with the toothed wheel, a synchronizing wheel on the pawl connected with the toothed wheel and pawl plates mounted on said wheel to coöperate with the synchronizing wheel during the latter part of each revolution of the control wheel.

42. A knitting machine including a laterally shiftable three-armed lever, means under the control of said lever for varying the tension of the stitches, and means also under the control of said lever for operating the yarn changing mechanism.

43. A knitting machine having controlling devices for producing split foot or plain foot stockings, said devices including a slide provided with an adjustable stud movable to and from operative position, and connections coöperating with said stud to determine the character of the foot when the stud is in operative position.

44. In a knitting machine of the character described the combination with the needles, cam cylinder, cam cylinder actuating means, and thread delivering means, of two control wheels, one for controlling the knitting of the leg and foot and the other for controlling the knitting of the heel and toe of the stocking, means to impart one revolution to the leg and foot wheel and two revolutions to the heel and toe wheel during the knitting of each stocking, means through which said wheels control the cylinder actuating means during the operation of the machine and means for independently regulating the speed of the leg and foot wheel to vary the length of the leg and of the foot.

45. A circular knitting machine having two sets of active knitting cams diametrically opposite each other, a circular series of sinkers, and a sinker cam ring having a cam composed of relatively adjustable sections adjacent one of the sets of knitting cams, and means for rigidly securing said sections in adjusted positions.

46. A circular knitting machine having two sets of active knitting cams diametrically opposite each other, a circular series of sinkers, and a sinker cam ring having an annular cam including two sinker shifting segments one of which is adjacent one of the sets of knitting cams and is adjustable angularly and radially on said ring, and means for rigidly securing said segment in adjusted position.

47. A circular knitting machine having two sets of active knitting cams diametrically opposite each other, a circular series of sinkers, and a sinker cam ring having an annular cam including two sinker shifting segments one of which is adjacent one of the sets of knitting cams and is made up of relatively adjustable sections, and means for rigidly securing said sections to the ring with provision for angular and radial adjustment.

48. In a knitting machine of the character described, in combination, a pair of control wheels, means to actuate said wheels, a shipper lever, a clutch operated by said lever, a main slide for operating the shipper lever comprising a lever engaging member movably mounted thereon, a supplemental slide controlling the lever engaging member, means through which one of said wheels operates the main slide, and means through which the other of said wheels controls the supplemental slide to determine the action of the lever engaging member on the shipper lever.

49. In a knitting machine of the character described, in combination, a pair of control wheels, means to actuate said wheels, a shipper lever, a clutch operated by said lever, a main slide for operating the shipper lever comprising a lever engaging member movably mounted thereon, a supplemental slide controlling the lever-engaging member, means through which one of said wheels operates the main slide, means through which the other of said wheels controls the supplemental slide to determine the action of the lever-engaging member on the shipper lever, main thread supplying means, reinforce thread supplying means, and means through which the supplemental slide controls the cutting out of the reinforce thread.

50. In a knitting machine of the character described, in combination, a pair of control wheels, means to actuate said wheels, a shipper lever, a clutch operated by said lever, a main slide for operating the shipper lever comprising a lever engaging member movably mounted thereon, a supplemental slide controlling the lever engaging member, means through which one of said wheels operates the main slide, means through which the other of said wheels controls the supplemental slide to determine the action of the lever engaging member on the shipper lever, main thread supplying means, reinforce thread supplying means, and means through which the supplemental slide controls the cutting out of the reinforce thread, so that the latter is cut out only at the completion of the heel.

51. In a knitting machine of the character described, in combination, a pair of control wheels, means to actuate said wheels, a shipper lever, a clutch operated by said lever, a main slide for operating the shipper lever comprising a lever engaging pawl pivotally mounted thereon, a supplemental slide mounted on the main slide and controlling the lever engaging pawl, means through which one of said wheels operates the main slide, and means through which the other of said wheels controls the supplemental slide to determine the action of the pawl upon the shipper lever.

52. In a knitting machine of the character described, in combination, a control wheel, a cam cylinder, means to actuate said cylinder at either one of two speeds, a movable member through which said wheel controls the speed of said cylinder, a clutch for connecting the cylinder with said actuating means, a shipper lever for said clutch controlled by said wheel, and means through which the shipper lever holds said movable member against operating when said lever occupies one of its two positions.

53. In a knitting machine, the combination with the needles and yarn-changers, of two suture needles, means whereby each of two threads will be knit by both suture needles, and means for automatically knitting off from the needles the thread that is thrown out of action at the start of the heel and toe, whereby cutting of the thread by sinkers is avoided.

54. In a knitting machine having a control wheel, means for rotating it step-by-step, a circular series of abutments independently movable to and from operative positions, and a pawl to engage the abutments that are in operative positions, to boost or advance the wheel rapidly through predetermined periods of its rotation.

In testimony whereof I have affixed my signature, in presence of two witnesses.

ARTHUR N. AMES.

Witnesses:
C. F. BROWN,
A. W. HARRISON.